United States Patent
Komukai et al.

(10) Patent No.: US 12,060,468 B2
(45) Date of Patent: Aug. 13, 2024

(54) COMPOSITE MATERIAL, PREPREG, CARBON FIBER REINFORCED MOLDED PRODUCT, AND METHOD FOR PRODUCING COMPOSITE MATERIAL

(71) Applicant: NITTA CORPORATION, Osaka (JP)

(72) Inventors: Takuji Komukai, Osaka (JP); Maki Onizuka, Osaka (JP); Hiromi Teruhira, Osaka (JP)

(73) Assignee: NITTA CORPORATION, Osaka (JP)

(*) Notice: Subject to any disclaimer, the term of this patent is extended or adjusted under 35 U.S.C. 154(b) by 746 days.

(21) Appl. No.: 15/734,624

(22) PCT Filed: Jun. 10, 2019

(86) PCT No.: PCT/JP2019/022976
§ 371 (c)(1),
(2) Date: Mar. 11, 2021

(87) PCT Pub. No.: WO2019/240094
PCT Pub. Date: Dec. 19, 2019

(65) Prior Publication Data
US 2021/0230386 A1    Jul. 29, 2021

(30) Foreign Application Priority Data

Jun. 11, 2018  (JP) .................. 2018-111473
Sep. 21, 2018  (JP) .................. 2018-178137
Mar. 26, 2019  (JP) .................. 2019-059510

(51) Int. Cl.
*C08J 5/00*    (2006.01)
*B32B 5/12*    (2006.01)
(Continued)

(52) U.S. Cl.
CPC ............... *C08J 5/248* (2021.05); *B32B 5/28* (2013.01); *C08J 5/005* (2013.01); *C08J 5/042* (2013.01);
(Continued)

(58) Field of Classification Search
None
See application file for complete search history.

(56) References Cited

U.S. PATENT DOCUMENTS 7,867,468 B1 *  1/2011  Haddon ............... B82Y 40/00
                                                    977/720
8,470,946 B1 *  6/2013  Carlson ................. D01F 1/10
                                                    977/788
(Continued)

FOREIGN PATENT DOCUMENTS

CN       101173386 A  *  5/2008
CN       101284423 A  * 10/2008
(Continued)

OTHER PUBLICATIONS

Machine Translation of JP-2008201626-A, Sep. 2008 (Year: 2008).*
(Continued)

*Primary Examiner* — Jeffrey A Vonch
(74) *Attorney, Agent, or Firm* — Muncy, Geissler, Olds & Lowe, P.C.

(57) ABSTRACT

Provided are a composite material capable of further enhancing property derived from carbon nanotubes adhered to carbon fibers, a prepreg, a carbon-fiber-reinforced molded article, and a method for manufacturing a composite material. There is provided a composite material including:
(Continued)

carbon fibers; and a structure which includes a plurality of carbon nanotubes and has a network structure in which the carbon nanotubes are in direct contact with each other, and in which the carbon nanotubes adhered to surfaces of the carbon fibers directly adhere to the surfaces of the carbon fibers. The carbon nanotubes have a bent shape having a bent portion.

14 Claims, 20 Drawing Sheets

(51) Int. Cl.
| | |
|---|---|
| B32B 5/26 | (2006.01) |
| B32B 5/28 | (2006.01) |
| C08J 5/04 | (2006.01) |
| C08J 5/06 | (2006.01) |
| C08J 5/24 | (2006.01) |
| C09C 1/44 | (2006.01) |
| D06M 10/02 | (2006.01) |
| D06M 11/74 | (2006.01) |
| B32B 5/02 | (2006.01) |
| C01B 32/05 | (2017.01) |
| C01B 32/168 | (2017.01) |
| C01B 32/174 | (2017.01) |
| C01B 32/176 | (2017.01) |

(52) U.S. Cl.
CPC .............. *C08J 5/06* (2013.01); *C08J 5/243* (2021.05); *C09C 1/44* (2013.01); *D06M 10/02* (2013.01); *D06M 11/74* (2013.01); *B32B 5/022* (2013.01); *B32B 5/12* (2013.01); *B32B 5/26* (2013.01); *B32B 2260/021* (2013.01); *B32B 2260/046* (2013.01); *B32B 2262/106* (2013.01); *B32B 2305/076* (2013.01); *B32B 2305/08* (2013.01); *B32B 2305/20* (2013.01); *B32B 2305/72* (2013.01); *B32B 2307/50* (2013.01); *B32B 2307/546* (2013.01); *C01B 32/05* (2017.08); *C01B 32/168* (2017.08); *C01B 32/174* (2017.08); *C01B 32/176* (2017.08); *C01B 2202/34* (2013.01); *C01B 2202/36* (2013.01); *C01P 2004/16* (2013.01); *C01P 2004/86* (2013.01); *C08J 5/04* (2013.01); *C08J 2363/00* (2013.01); *Y10T 428/249944* (2015.04); *Y10T 428/249945* (2015.04); *Y10T 428/249948* (2015.04); *Y10T 428/24995* (2015.04); *Y10T 428/249952* (2015.04); *Y10T 428/25* (2015.01); *Y10T 428/2915* (2015.01); *Y10T 428/292* (2015.01); *Y10T 428/2922* (2015.01); *Y10T 428/2927* (2015.01); *Y10T 428/2978* (2015.01)

(56) References Cited

U.S. PATENT DOCUMENTS

| | | | | |
|---|---|---|---|---|
| 2003/0004058 A1* | 1/2003 | Li | ............... | B01J 23/745 423/447.3 |
| 2004/0067364 A1* | 4/2004 | Ishikawa | ............... | C08K 7/24 428/411.1 |
| 2006/0166003 A1* | 7/2006 | Khabashesku | ....... | C01B 32/156 428/408 |
| 2007/0207318 A1* | 9/2007 | Jin | ............... | B82Y 30/00 428/408 |
| 2008/0039557 A1* | 2/2008 | Li | ............... | C08L 63/00 523/468 |
| 2008/0075954 A1* | 3/2008 | Wardle | ............... | C01B 32/18 156/60 |
| 2008/0254296 A1* | 10/2008 | Handa | ............... | B01J 35/23 428/408 |
| 2009/0176112 A1* | 7/2009 | Kruckenberg | .... | C04B 35/62842 428/688 |
| 2009/0220409 A1* | 9/2009 | Curliss | ............... | B01J 23/75 423/447.2 |
| 2010/0098931 A1* | 4/2010 | Daniel | ............... | C08J 5/10 427/407.1 |
| 2010/0143701 A1* | 6/2010 | Zhu | ............... | B29C 70/081 428/323 |
| 2011/0024694 A1* | 2/2011 | Shah | ............... | C08J 5/06 252/502 |
| 2011/0123735 A1* | 5/2011 | Shah | ............... | B32B 9/00 428/221 |
| 2011/0135491 A1* | 6/2011 | Shah | ............... | B64G 1/428 428/688 |
| 2011/0151254 A1* | 6/2011 | Fugetsu | ............... | D06M 11/74 977/892 |
| 2011/0168089 A1* | 7/2011 | Shah | ............... | D03D 15/46 977/843 |
| 2011/0186775 A1* | 8/2011 | Shah | ............... | D01F 9/12 524/576 |
| 2011/0200755 A1* | 8/2011 | Mezzo | ............... | D01F 11/00 524/611 |
| 2011/0297892 A1* | 12/2011 | Shah | ............... | B82Y 30/00 977/932 |
| 2012/0164900 A1* | 6/2012 | Reichwein | ............... | B29C 70/546 427/195 |
| 2013/0028744 A1* | 1/2013 | Nordin | ............... | F15D 1/12 428/113 |
| 2013/0302605 A1* | 11/2013 | Yang | ............... | D01F 9/12 264/105 |
| 2014/0001417 A1* | 1/2014 | Kim | ............... | C08J 3/2053 252/511 |
| 2014/0151111 A1* | 6/2014 | Shah | ............... | H05K 9/009 427/457 |
| 2016/0023904 A1* | 1/2016 | Hart | ............... | B81C 1/00626 427/249.15 |
| 2016/0083899 A1* | 3/2016 | Onizuka | ............... | C08J 5/005 423/447.2 |
| 2016/0348283 A1* | 12/2016 | Jo | ............... | D01F 9/225 |
| 2017/0204271 A1* | 7/2017 | Harutyunyan | ............... | C09C 1/44 |
| 2017/0314188 A1 | 11/2017 | Komukai et al. | | |
| 2018/0112047 A1* | 4/2018 | Komukai | ............... | C08J 5/042 |
| 2018/0119332 A1 | 5/2018 | Komukai et al. | | |
| 2018/0265217 A1* | 9/2018 | Ballocchi | ............... | B64C 1/12 |

FOREIGN PATENT DOCUMENTS

| | | | | |
|---|---|---|---|---|
| CN | 101718037 A | * | 6/2010 | |
| CN | 102099403 A | | 6/2011 | |
| CN | 102924736 A | * | 2/2013 | |
| CN | 103321034 A | * | 9/2013 | |
| CN | 103409985 A | * | 11/2013 | |
| CN | 104120605 A | * | 10/2014 | |
| CN | 104327454 A | * | 2/2015 | |
| CN | 104558525 A | * | 4/2015 | |
| CN | 104894869 A | * | 9/2015 | |
| CN | 105418969 A | * | 3/2016 | ............... C08K 7/06 |
| CN | 106149357 A | * | 11/2016 | |
| CN | 106906642 A | * | 6/2017 | ............. D06M 11/74 |
| CN | 107476055 A | * | 12/2017 | ............. D06M 11/74 |
| EP | 2990380 A1 | | 3/2016 | |
| EP | 3279394 A1 | | 2/2018 | |
| JP | 2007070593 A | * | 3/2007 | |
| JP | 2008201626 A | * | 9/2008 | |
| JP | 2008201626 A | | 9/2008 | |
| JP | 2013-076198 A | | 4/2013 | |
| JP | 2016084547 A | | 5/2016 | |
| JP | 2016190969 A | | 11/2016 | |
| JP | 2016194165 A | | 11/2016 | |
| TW | 201036911 A | * | 10/2010 | ............. C23C 16/409 |
| WO | WO-2016159121 A1 | * | 10/2016 | ............. C08J 5/042 |
| WO | 2019065535 A1 | | 4/2019 | |

(56) References Cited

OTHER PUBLICATIONS

Office action of the corresponding CN application No. 201980052734.5 mailed Sep. 27, 2022 and English translation thereof.

Song Qiang, Microstructure and mechanical performance of in-situ grown CNT doped carbon/carbon composites, China Paper Full Database Engineering Technology I, B020-37 [English abstract is included on page V-VIII; this non-patent literature is disclosed in the office action of the corresponding CN application No. 201980052734.5 currently disclosed herein; and therefore it is believed that a concise explanation of relevancy has been provided.].

Dong Liubing et al: "Preparation of continuous carbon nanotube networks in carbon fiber/epoxy composite", Composites Part A, vol. 56, Jan. 1, 2014 (Jan. 1, 2014), pp. 248-255, XP055907922, Amsterdam, NL.

Vohrer U. et al: "Kohlenstoff-Nanorohren—Phönix aus der Asche", Vakuum in Forschung Uno Praxis, vol. 19, No. 2, Apr. 1, 2007 (Apr. 1, 2007), pp. 22-30, XP055906896, DE.

Fei Yiyang et al: "Defective Nanographenes Containing Seven-FiveSeven (7-5-7)-Membered Rings", Journal of the American Chemical Society, vol. 143, No. 5, Feb. 10, 2021 (Feb. 10, 2021), pp. 2353-2360, XP055906412.

The extended European search report of the corresponding EP application No. 19820455.4 mailed Apr. 12, 2022.

\* cited by examiner

COMPOSITE MATERIAL, PREPREG, CARBON FIBER REINFORCED MOLDED PRODUCT, AND METHOD FOR PRODUCING COMPOSITE MATERIAL

TECHNICAL FIELD

The present invention relates to a composite material, a prepreg, a carbon-fiber-reinforced molded article, and a method for manufacturing a composite material.

BACKGROUND ART

There is suggested a composite material including a structure includes carbon fibers and a plurality of carbon nanotubes (hereinafter, referred to as "CNTs") adhered to surfaces of the carbon fibers (for example, Patent Document 1). In the structure of the composite material, the plurality of CNTs have a network structure in which the CNTs are connected to each other, and adhere to the surfaces of the carbon fibers. A carbon-fiber-reinforced molded article in which a resin is reinforced by the composite material as a reinforcement fiber includes the carbon fibers, and thus higher strength and rigidity are obtained in comparison to a resin alone, and has improved electrical conductivity, thermal conductivity, and a mechanical property which are derived from the CNTs.

CITATION LIST

Patent Document

Patent Document 1: JP-A-2013-76198

SUMMARY OF THE INVENTION

Technical Problem

The use of the carbon-fiber-reinforced molded article has been expanded to various fields such as aircrafts, automobiles, general industry, and sport equipment. In the carbon-fiber-reinforced molded article, requirements for the mechanical properties have further increased. According to this, even in the composite material in which the plurality of CNTs have adhered to the surface of the carbon fibers, it is desired to enhance properties derived from the CNTs.

An object of the invention is to provide a composite material capable of further enhancing properties derived from CNTs adhered to carbon fibers, a prepreg using the composite material, a carbon-fiber-reinforced molded article, and a method for manufacturing a composite material.

Solution to Problem

According to an aspect of the invention, there is provided a composite material including: carbon fibers; and a structure which includes a plurality of carbon nanotubes and has a network structure in which the carbon nanotubes are in direct contact with each other, and in which the carbon nanotubes adhered to surfaces of the carbon fibers directly adhere to the surfaces of the carbon fibers. The carbon nanotubes have a bent shape having a bent portion.

According to another aspect of the invention, there is provided a method for manufacturing a composite material. The method includes: an ultrasonic process of applying ultrasonic vibration to a dispersion in which a plurality of carbon nanotubes in a bent shape having a bent portion are dispersed; and an adhesion process of immersing a carbon fiber bundle including a plurality of continuous carbon fibers while opening in the dispersion to which the ultrasonic vibration is applied, causing the plurality of carbon nanotubes to adhere to the carbon fibers to form a structure on a surface of each of the carbon fibers.

According to still another aspect of the invention, there is provided a prepreg including: the composite material in which a carbon fiber bundle is formed by a plurality of the carbon fibers which are continuous, and the structure is formed on each of the carbon fibers of the carbon fiber bundle; and a matrix resin in a state of being impregnated into the composite material.

According to still another aspect of the invention, there is provided a carbon-fiber-reinforced molded article including: the composite material in which a carbon fiber bundle is formed by a plurality of the carbon fibers which are continuous, and the structure is formed on each of the carbon fibers of the carbon fiber bundle; and a matrix resin that is cured in a state of being impregnated into the composite material.

According to still another aspect of the invention, there is provided a carbon-fiber-reinforced molded article including: the composite material in which a carbon fiber bundle is formed by a plurality of the carbon fibers which are continuous, and the structure is formed on each of the carbon fibers of the carbon fiber bundle; and a matrix resin that is cured in a state of being impregnated into the composite material. On the basis of a bending elastic modulus that is measured at a test speed of 5 mm/minute in a three-point bending test conforming to JIS K 7074:1988 by using a test piece having a plate shape which has a length of 100 mm, a width of 15 mm, and a thickness of 1.8 mm, and in which a width direction matches a fiber axis direction of the carbon fibers, an increasing rate of a bending elastic modulus that is measured under the same condition by setting a test speed of 1,000 mm/second is 2% or less.

According to still another aspect of the invention, there is provided a carbon-fiber-reinforced molded article including: the composite material in which a carbon fiber bundle is formed by a plurality of the carbon fibers which are continuous, and the structure is formed on each of the carbon fibers of the carbon fiber bundle; and a matrix resin that is cured in a state of being impregnated into the composite material. A logarithmic decrement in an amplitude is 0.029% or more, the amplitude being obtained from the amount of displacement of the other end of a test piece that has a plate shape which has a length of 200 mm, a width of 15 mm, and a thickness of 1.8 mm and in which a longitudinal direction matches a fiber axis direction of the carbon fibers, and is horizontally fixed by clamping one end in a length range of 50 mm in the longitudinal direction, and the amount of displacement being measured after pressing the other end of the test piece and releasing the other end of the test piece.

According to still another aspect of the invention, there is provided a carbon-fiber-reinforced molded article including: the composite material in which a carbon fiber bundle is formed by a plurality of the carbon fibers which are continuous, and the structure is formed on each of the carbon fibers of the carbon fiber bundle; and a matrix resin that is cured in a state of being impregnated into the composite material. When performing a pulsating three-point bending fatigue test in which pressing against a test piece having a plate shape which has a length of 20 mm, a width of 15 mm, and a thickness of 1.8 mm and in which a width direction matches a fiber axis direction of the carbon fibers from an upward side and release of the pressing are repeated in a state of supporting the test piece from a lower side with a pair of supporting points disposed to be spaced apart from each other by 20 mm in a longitudinal direction of the test piece, the number of times of repetition of pressing until a load at the time of pressing performed when a stress amplitude is within a range of 1,100 to 1,300 MPa reaches zero is within a range of 92,000 to 1,000,000.

Advantageous Effects of the Invention

According to the invention, since the carbon nanotubes adhered to the carbon fibers of the carbon fiber bundle have the bent shape including the bent portion, the number of the carbon nanotubes adhered to the carbon fibers increases, and properties derived from the carbon nanotubes can be further enhanced.

According to the invention, since the composite material is manufactured by causing the carbon nanotubes, which has a structure knitted like a non-woven fabric fiber and has the bent shape including the bent portion, to adhere to the surfaces of the carbon fibers of the carbon fiber bundle, it is possible to produce the composite material in which the number of the carbon nanotubes adhered to the carbon fibers further increases, and properties derived from the carbon nanotubes are further enhanced.

DESCRIPTION OF EMBODIMENTS

First Embodiment

[Composite Material]

Figure 1:
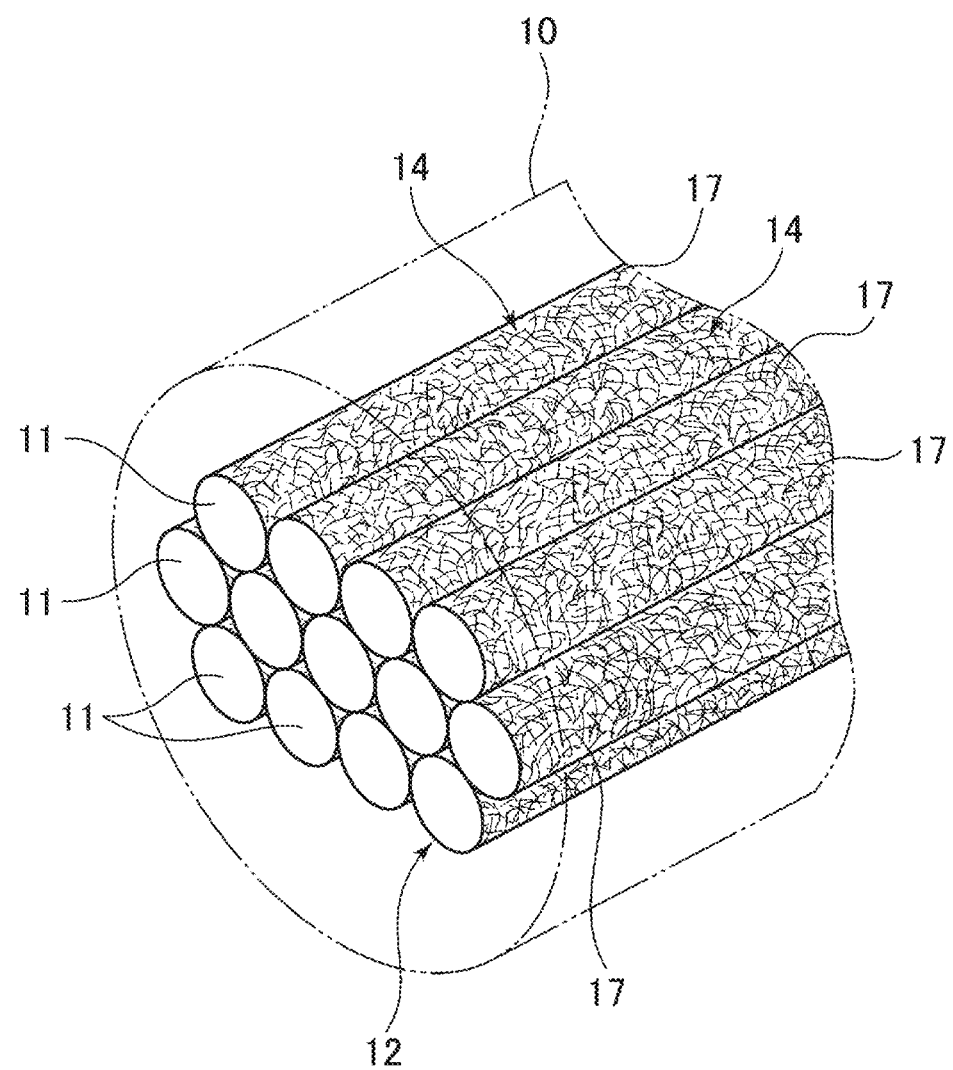
FIG. 1 is an explanatory diagram illustrating a configuration of a composite material according to a first embodiment.

In FIG. 1, a composite material 10 includes a carbon fiber bundle 12 in which a plurality of continuous carbon fibers 11 are arranged. A structure 14 is formed on a surface of each of the carbon fibers 11, and a sizing agent (not illustrated) adheres to a surface of the structure 14.

The carbon fibers 11 which constitute the carbon fiber bundle 12 are not entangled with each other, and a fiber axis direction of each of the carbon fiber 11 is aligned. The fiber axis direction is a direction (extension direction) of an axis of the carbon fiber 11. In this example, the carbon fiber bundle 12 is constituted by 12,000 carbon fibers 11. The number of the carbon fibers 11 which include the carbon fiber bundle 12 is not particularly limited, and may be set, for example, within a range of 10,000 to 100,000. Note that, in FIG. 1, only a dozen pieces of the carbon fibers 11 are drawn for convenience of explanation.

Entanglement of the carbon fibers 11 in the carbon fiber bundle 12 can be evaluated with the degree of disturbance of the carbon fibers 11. For example, the carbon fiber bundle 12 is observed with a scanning electron microscope (SEM) at a constant magnification, and lengths of a predetermined number (for example, 10) carbon fibers 11 in an observation range (a predetermined length range of the carbon fiber bundle 12) are measured. The degree of disturbance of the carbon fibers 11 can be evaluated on the basis of a variation, a difference between a maximum value and a minimum value, and a standard deviation of the lengths which are obtained from the measurement results and relate to the predetermined number of carbon fibers 11. In addition, it can be determined that the carbon fibers 11 are not substantially entangled by measuring the degree of entanglement, for example, in conformity to a method of measuring the degree of entanglement in JIS L1013:2010 "Testing methods for man-made filament yarns". The smaller the measured degree of entanglement is, the less the carbon fibers 11 are entangled with each other in the carbon fiber bundle 12.

In the carbon fiber bundle 12 in which the carbon fibers 11 are not substantially entangled with each other, or are less entangled with each other, the carbon fibers 11 are likely to be uniformly opened. According to this, it is easy to cause the CNT 17 to uniformly adhere to the carbon fibers 11, a resin is uniformly impregnated into the carbon fiber bundle 12 when producing a prepreg, and each of the carbon fibers 11 contributes to the strength.

As the carbon fibers 11, a PAN-based or pitch-based fiber obtained by baking an organic fiber such as polyacrylic nitrile, rayon, and pitch which are derived from petroleum, coal, and coal tar, and an organic fiber derived from wood or a plant fiber, and the like can be used without particular limitation. In addition, with regard to the diameter of the carbon fibers 11, there is no particular limitation, a fiber having a diameter in a range of approximately 5 to 20 µm can be preferably used, and a fiber having a diameter in a range of approximately 5 to 10 µm can be more preferably used. As the carbon fibers 11, a long fiber can be used, a length thereof is preferably 50 m or longer, more preferably in a range of 100 to 100,000 m, and still more preferably in a range of 100 to 10,000 m. Note that, when a prepreg or a carbon-fiber-reinforced molded article is formed, the carbon fibers 11 may be cut short.

As described above, the structure 14 is formed on the surface of each of the carbon fibers 11. In the structure 14, a plurality of carbon nanotubes (hereinafter, referred to as "CNTs") 17 are entangled. The CNTs 17 which constitute the structure 14 are uniformly dispersed and entangled across substantially the entire surface of the carbon fibers 11, and form a network structure in which the plurality of CNTs 17 are connected in a state of being entangled with each other. The connection stated here includes physical connection (simple contact) and chemical connection. The CNTs 17 come into direct contact with each other without intervening materials such as a dispersing agent including a surfactant, and adhesive therebetween.

Some of the CNTs 17 which constitute the structure 14 directly adhere and are fixed to the surfaces of the carbon fibers 11. According to this, the structure 14 directly adheres to the surfaces of the carbon fibers 11. A structure in which the CNTs 17 directly adhere to the surfaces of the carbon fibers 11 represents that the CNTs 17 directly adhere to the carbon fibers 11 in a state in which a dispersing agent such as a surfactant, adhesive, or the like is not interposed between the CNTs 17 and the surfaces of the carbon fibers 11, and adhesion (fixing) is obtained due to coupling by Van der Waals force. Since some of the CNTs 17 which constitute the structure 14 directly adhere to the surfaces of the carbon fibers 11, it enters a direct contact state in which the structure 14 comes into direct contact with the surfaces of the carbon fibers 11 without inclusions such as the dispersing agent, the adhesive, or the like.

In addition, some of the CNTs 17 which constitute the structure 14 are entangled with other CNTs 17 and are fixed to the carbon fibers 11 without direct contact with the surfaces of the carbon fibers 11. In addition, some of the CNTs 17 directly adhere to the surfaces of the carbon fibers 11 and are entangled with other CNTs 17 to be fixed to the carbon fibers 11. In the following description, fixing of the CNTs 17 to the carbon fibers 11 is collectively referred to as adhesion to the carbon fibers 11. Note that, a state in which the CNTs 17 are entangled includes a state in which some of the CNTs 17 are pressed against other CNTs 17.

As described above, in addition to direction contact with the surfaces of the carbon fibers 11, the CNTs 17 which constitute the structure 14 are fixed to the carbon fibers 11 by entanglement with other CNTs 17 which are not direct contact with the surface of the carbon fibers 11, or the like. Accordingly, the structure 14 of this example includes more CNTs 17 than the CNTs which directly adhere to the surface of the carbon fibers as in the structure of the composite material of the related art. That is, the number of the CNTs 17 which adhere to the carbon fibers 11 further increases in comparison to the related art.

As described above, the plurality of CNTs 17 are connected to each other without intervening materials between surfaces, thereby constituting the structure 14. Accordingly, the composite material 10 exhibits performance of electric conductivity and thermal conductivity derived from the CNTs. In addition, since the CNTs 17 adhere to the surfaces of the carbon fibers 11 without intervening materials, the CNTs 17 constituting the structure 14 are less likely to be peeled off from the surfaces of the carbon fibers 11, and mechanical strength of the composite material 10 and a carbon-fiber-reinforced molded article including the composite material 10 is improved.

As to be described later, in the carbon-fiber-reinforced molded article, the carbon fiber bundle 12 constituted by the plurality of carbon fibers 11 on which the structure 14 is formed is impregnated with a matrix resin, and the matrix resin is cured. Since the structure 14 is impregnated with the matrix resin, the structure 14 of each of the carbon fibers 11 is fixed to the surface of the carbon fiber 11 and the matrix resin. According to this, it enters a state in which the carbon fibers 11 is strongly bonded to the matrix resin, and peeling strength between the composite material 10 and the matrix resin is improved. In addition, bonding with the matrix resin extends over the entire composite material 10, and thus a fiber reinforcement effect is obtained in the entirety of the carbon-fiber-reinforced molded article.

In addition, when an external force is applied to the carbon-fiber-reinforced molded article and displacement occurs at the inside of the carbon-fiber-reinforced molded article, displacement occurs in the carbon fiber 11 inside the carbon fiber reinforced molded product. Due to the displacement of the carbon fiber 11, the structure 14 is stretched, and a constraining effect is obtained due to a network structure of the CNTs 17. According to this, properties of the CNTs are exhibited, and thus an elastic modulus of the carbon-fiber-reinforced molded article can be raised.

In addition, a region (hereinafter, referred to as "composite region"), in which the CNTs 17 constituting the structure 14 is impregnated with the matrix resin and the matrix resin is cured, is formed at the periphery of the carbon fibers 11 inside the carbon-fiber-reinforced molded article. The composite region efficiently absorbs mechanical energy applied from the outside. That is, in a case where energy such as vibration propagates between the carbon fibers 11, the energy of the propagating vibration is absorbed by friction of the composite region at the periphery of the carbon fibers 11 and is damped. As a result, for example, vibration damping property (damping properties) of the carbon-fiber-reinforced molded article are improved.

The structure 14 that is formed on each of the plurality of carbon fiber 11 has an independent structure, and the structure 14 of one of the carbon fibers 11 does not share the same CNT 17 with the structure 14 of another carbon fiber 11. That is, the CNTs 17 contained in the structure 14 provided in the one carbon fiber 11 is not contained in the structure 14 provided in the other carbon fiber 11.

For example, the sizing agent is fixed to the CNTs 17 to cover a surface of the structure 14. The sizing agent is formed from a cured product or an uncured product of a reactive curing resin, a thermosetting resin, or a thermoplastic resin. The sizing agent is formed by performing a sizing treatment. Note that, the sizing agent stated here is formed on a surface layer of the structure 14, and is different from a fixing resin part that enters the inside of the structure 14 and fixes the CNTs 17 to the carbon fibers 11 as to be described later. In the following description, a treatment of forming the sizing agent on the surface layer of the structure 14 is referred to as a first sizing treatment, a sizing agent that adhered to the surface layer of the structure 14 by the first sizing treatment is referred to as a first sizing agent, and a sizing treatment of forming the fixing resin part (second sizing agent) is referred to as a second sizing treatment.

The CNTs 17 adhered to the carbon fibers 11 have a bent shape. The bent shape of the CNTs 17 is obtained because a bent portion is provided due to existence of a five-membered ring, a seven-membered ring, and the like of carbon in a graphite structure of the CNTs 17, and the bent shape is a shape from which the CNTs 17 can be evaluated to be curved or the like from observation with a SEM. For example, the bent shape of the CNTs 17 represents that the bent portion exists at least at one site per an average length of a use range of the CNTs 17 to be described later. Even in a case where the bent shape is long, the CNTs 17 having the bent shape adhere to the surfaces of the carbon fibers 11 which are curved surfaces in various postures. In addition, the CNTs 17 having the bent shape are likely to form a space (gap) between the surfaces of the carbon fibers 11 to which the CNTs 17 adhere, or between the adhered CNTs 17, and another CNT 17 enters the space. According to this, when using the CNTs 17 having the bent shape, the number of the CNTs 17 adhered to the carbon fibers 11 (the number of the CNTs 17 forming the structure 14) further increases in comparison to the case of using CNTs having a shape with high linearity.

The length of the CNTs 17 is preferably within a range of 0.1 to 10 µm. When the length is 0.1 µm or longer, the CNTs 17 can more reliably form the structure 14 in which the CNTs 17 are entangled and come into direct contact with each other or are directly connected to each other, and it is possible to more reliably form the space which the other CNT 17 enters as described above. In addition, when the length of the CNTs 17 is 10 µm or less, the CNTs 17 do not adhere between the carbon fibers 11. That is, as described above, a CNT 17 that is contained in the structure 14 provided in one carbon fiber 11 is not contained in the structure 14 provided in another carbon fiber 11.

The length of the CNTs 17 is more preferably within a range of 0.2 to 5 µm. When the length of the CNTs 17 is 0.2 µm or longer, the number of the CNTs 17 adhered increases and the structure 14 can be made thick. When the length is 5 µm or less, when causing the CNTs 17 to adhere to the carbon fibers 11, the CNTs 17 are less likely to aggregate, and the CNTs 17 are likely to be more evenly dispersed. As a result, the CNTs 17 more evenly adhere to the carbon fibers 11.

Note that, with regard to the CNTs adhered to the carbon fibers 11, mixing-in of CNTs with high linearity or mixing-in of CNTs having a length out of the above-described range are not excluded. For example, even in a case where mixing-in occurs, since the CNTs with high linearity enter a space formed by the CNTs 17, it is possible to increase the number of the CNTs adhered to the carbon fibers 11.

It is preferable that an average diameter of the CNTs 17 is within a range of 1 to 15 nm, and more preferably a range of 3 to 10 nm. When the diameter is 15 nm or less, the CNTs 17 are very flexible and are likely to adhere to the carbon fibers 11 along the surfaces thereof, and are likely to be fixed to the carbon fibers 11 in a state of being entangled with other CNTs 17. In addition to this, formation of the structure 14 becomes more reliable. In addition, when the diameter is 10 nm or less, coupling between the CNTs 17 constituting the structure 14 becomes strong. Note that, the diameter of the CNTs 17 is set as a value measured by using a transmission electron microscope (TEM). The CNTs 17 may be a single-layer structure or a multi-layer structure, but the multi-layer structure is preferable.

As described above, when the CNTs 17 are set to have the bent shape, it is possible to further increase the number of the CNTs 17 adhered to the carbon fibers 11 in comparison to the case of using CNTs with high linearity, and it is possible to increase the thickness of the structure 14. In addition, the structure 14 in which the CNTs 17 are knitted like a non-woven fabric fiber is formed. As a result, the mechanical strength is raised, and in a case where an external force is applied to the carbon-fiber-reinforced molded article and the carbon fibers 11 are displaced, a constraining effect due to the structure 14 is large, and thus the elastic modulus can be further raised. In addition, a mechanical energy absorbing effect due to the composite region at the periphery of the carbon fibers 11 also increases, and the vibration damping property of the carbon-fiber-reinforced molded article can be further enhanced.

As an example of the mechanical strength that is improved, an improvement in durability against repetitive bending can be exemplified. As described above, in the carbon-fiber-reinforced molded article using the composite material 10 in which the CNTs 17 adhered to the surfaces of the carbon fibers 11, it is considered that the durability against the repetitive bending can be enhanced by a peeling strength improving effect due to inclusion of the structure 14, and the mechanical energy absorbing effect due to the composite region. The peeling strength improving effect and the mechanical energy absorbing effect can be further enhanced in proportional to an increase in the number of the CNTs 17 adhered to the surfaces of the carbon fibers 11, and thus the durability against the repetitive bending becomes high. The composite material 10 having the above-described properties is suitable as a spring material of a coil spring or a leaf spring, or the like to which a load is repetitively applied, and thus the carbon-fiber-reinforced molded article containing the composite material 10 is applicable to various springs such as the coil spring and the leaf spring.

With regard to the carbon-fiber-reinforced molded article including the composite material 10, at a three-point bending fatigue test to be described later in detail, it is preferable that the number of times of repetition of pressing until a load at the time of pressing performed when a stress amplitude is within a range of 1,100 to 1,300 MPa reaches zero is within a range of 92,000 to 1,000,000.

The number of the CNTs 17 adhered to the carbon fibers 11 can be evaluated with the thickness of the structure 14 (a length in a diameter direction of the carbon fibers 11). For example, the thickness of each portion of the structure 14 can be measured as follows. Specifically, a part of the structure 14 on the surfaces of the carbon fibers 11 is bonded to a cellophane tape or the like and is peeled off, and a cross-section of the structure 14 remaining on the surfaces of the carbon fibers 11 is measured with a SEM or the like to acquire the thickness. In order to almost uniformly cover a measurement range of a predetermined length along a fiber axis direction of the carbon fibers 11, the thickness of the structure 14 is measured at ten sites in the measurement range, but an average is set as the thickness of the structure 14. For example, the length of the measurement range is set to a length that is five times an upper limit of a range of the length of the CNTs 17.

The thickness (average) of the structure 14 which is obtained as described above is preferably within a range of 10 to 300 nm, more preferably within a range of 15 to 200 nm, and still more preferably 50 to 200 nm. When the thickness of the structure 14 is 200 nm or less, an impregnation property with a resin between the carbon fibers 11 is satisfactory.

In addition, an adhesion state of the CNTs 17 to the carbon fibers 11 can be evaluated by using a weight ratio that is the weight of the CNTs 17 adhered per unit weight of the carbon fibers 11. When the weight (hereinafter, referred to as "CF weight") of only the carbon fibers 11 having a predetermined length is set as Wa, and the weight (hereinafter, referred to as "CNT weight") of the CNTs 17 adhered to the carbon fibers 11 is set as Wb, the weight ratio R is obtained as "R=Wb/(Wa+Wb)". Note that, details of measurement of the CF weight Wa and the CNT weight Wb will be described later.

It is preferable that the CNTs 17 uniformly adhere to the carbon fibers 11, and it is preferable that the CNTs 17 adhere to the carbon fibers 11 to cover the surface thereof. The adhesion state including uniformity of the CNTs 17 with respect to the carbon fiber 11 is observed with a SEM, and an obtained image can be visually evaluated.

In addition, uniformity of adhesion of the CNTs 17 to the carbon fibers 11 can be evaluated by using the weight ratio. The weight ratio R is preferably 0.0005 to 0.01.

When the weight ratio R is 0.0005 or more, in the carbon-fiber-reinforced molded article, the great constraining effect with the structure 14 and a great mechanical energy absorbing effect in the composite region as described above can be reliably obtained, and properties derived from the CNTs are improved. When the weight ratio R is 0.01 or less, resin impregnation of the structure 14 with the matrix resin is reliably performed. In addition, the weight ratio R is more preferably 0.001 to 0.01. When the weight ratio R is 0.001 or more, the structure 14 (CNTs 17) more reliably functions between almost all carbon fibers 11. When the weight ratio R is 0.01 or less, resin impregnation of the structure 14 with the matrix resin is reliably performed, and even in a case where a ratio of the matrix resin in the carbon-fiber-reinforced molded article is low, the structure 14 more reliably functions. In addition, the weight ratio R is still more preferably 0.001 to 0.005. When the weight ratio R is 0.005 or less, even in a case where the ratio of the matrix resin in the carbon-fiber-reinforced molded article is low, the structure 14 more reliably functions.

It is preferable that a standard deviation s of respective weight ratios R of ten measurement sites set within a range (hereinafter, referred to as "evaluation range") of 1 m in the length of one piece of the carbon fibers 11 is 0.0005 or less, and more preferably 0.0002 or less. In addition, a ratio of the standard deviation s to an average of the weight ratio R is preferably 40% or less, and more preferably 15% or less. It is preferable that the ten measurement sites are set to almost uniformly cover the evaluation range. The standard deviation s becomes an index of a variation in the adhesion number (adhesion amount) of the CNTs 17 adhered to the carbon fibers 11 and the thickness of the structure 14, and the smaller the variation is, the smaller a value of the standard deviation is. Accordingly, as the smaller the standard deviation s is small, it is more preferable. The variation of the adhesion number of the CNTs 17 and the thickness of the structure 14 is exhibited as a difference of properties derived from the CNTs in the composite material 10 and the carbon-fiber-reinforced molded article using the composite material 10. When the standard deviation s is 0.0005 or less, the properties derived from the CNTs in the composite material 10 and the carbon-fiber-reinforced molded article are more reliably exhibited, and when the standard deviations is 0.0002 or less, the properties derived from the CNTs are sufficiently and reliably exhibited. Note that, the standard deviation s is obtained by Expression (1). A value n in Expression (1) represents the number of measurement sites (n=10 in this example), a value Ri represents a weight ratio of the measurement sites, and a value Ra represents an average of the weight ratio.

[Formula 1]

$$s = \sqrt{\frac{1}{n}\sum_{i=j}^{n}(Ri - Ra)^2} \quad (1)$$

[Method for Manufacturing Composite Material]

In order to form the structure 14 by causing the CNTs 17 to adhere to each of the carbon fibers 11 in the carbon fiber bundle 12, the carbon fiber bundle 12 is immersed in a CNT isolated dispersion (hereinafter, simply referred to as "dispersion") in which the CNTs 17 are isolated and dispersed, and mechanical energy is applied to the dispersion. The term "isolated and dispersed" represents a state in which the CNTs 17 are physically separated one by one and are dispersed in a dispersion medium without entanglement, and a state in which a ratio of an aggregate in which two or more CNTs 17 are aggregated in a bundle form is 10% or less. Here, when the ratio of the aggregate is 10% or more, aggregation of the CNTs 17 in the dispersion medium is promoted, and adhesion of the CNTs 17 to the carbon fibers 11 is inhibited.

Figure 2:
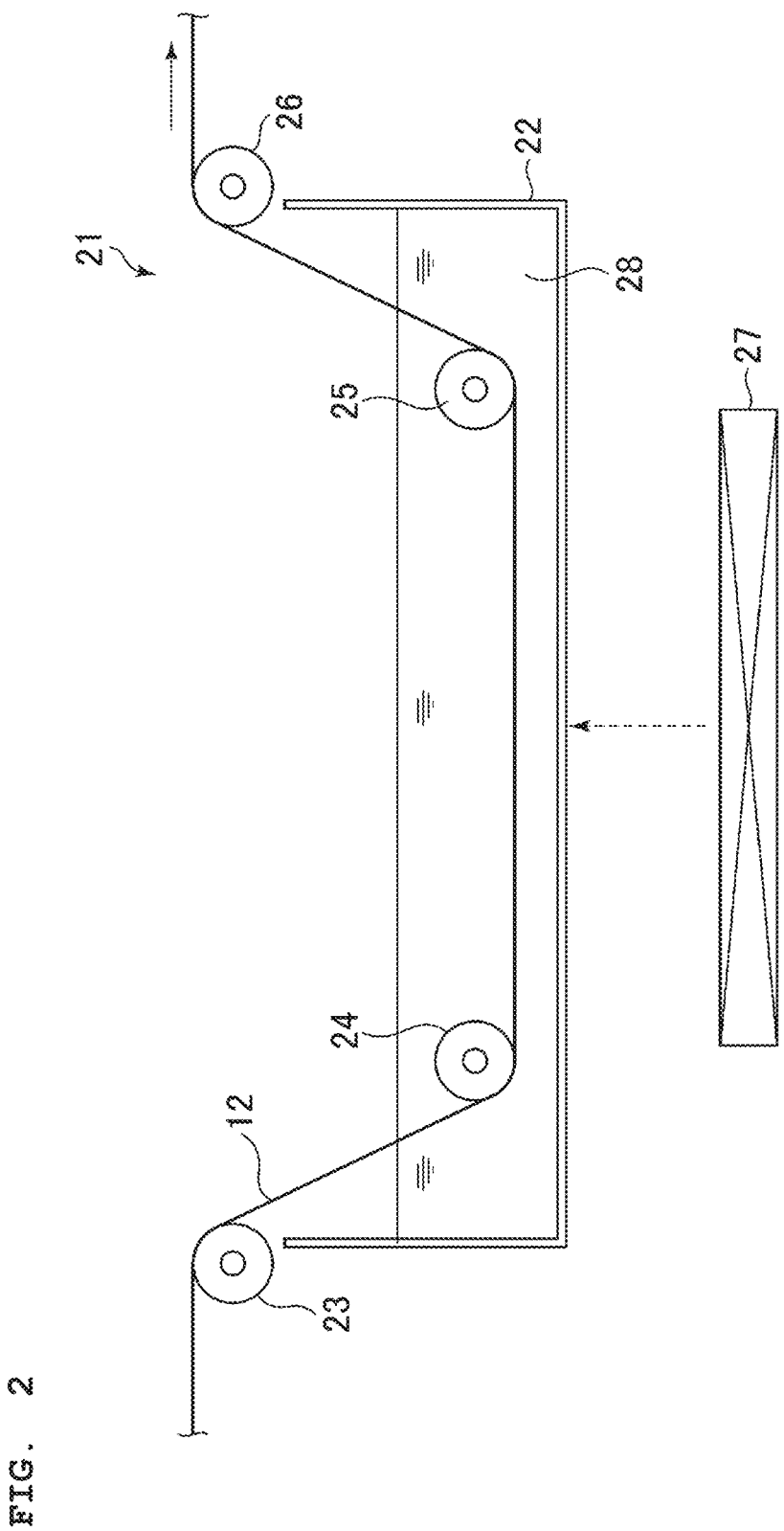
FIG. 2 is an explanatory diagram illustrating a configuration of an adhesion device that causes a CNT to adhere to a carbon fiber.

As illustrated in FIG. 2, as an example, an adhesion device 21 includes a CNT adhesion tank 22, guide rollers 23 to 26, an ultrasonic wave generator 27, a travelling mechanism (not illustrated) that causes the carbon fiber bundle 12 to travel at a constant speed, and the like. A dispersion 28 is stored in the CNT adhesion tank 22.

The carbon fiber bundle 12 having a long size (for example, approximately 100 m) is continuously supplied to the adhesion device 21. The carbon fiber bundle 12 that is supplied is wound around the guide rollers 23 to 26 in this order, and travels at a constant speed by the travelling mechanism. The carbon fiber bundle 12 in which the sizing agent does not adhere to the carbon fibers 11 is supplied to the adhesion device 21. Note that, the sizing agent stated here represents an object adhered to the surfaces of the carbon fibers 11 to prevent entanglement of the carbon fibers 11, and the like, and is different from the first sizing agent and the fixing resin part.

The carbon fiber bundle 12 is wound around the guide rollers 23 to 26 in an opened state. Appropriate tension acts on the carbon fiber bundle 12 wound around the guide rollers 23 to 26, and thus the carbon fibers 11 are less likely to be entangled with each other. It is preferable that the winding of the carbon fiber bundle 12 around the guide rollers 24 to 26 is set to a smaller winding angle (90° or less).

Figure 3:
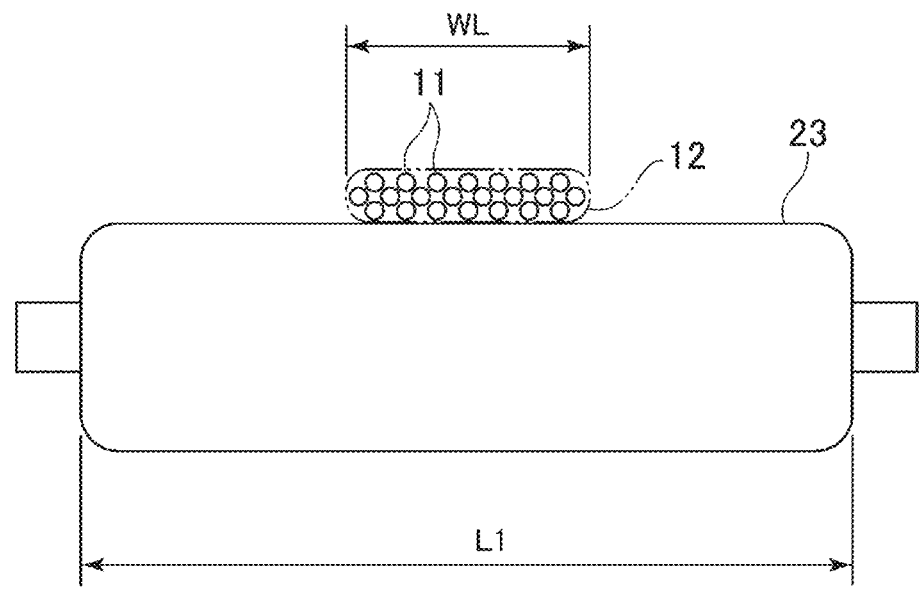
FIG. 3 is an explanatory diagram illustrating a carbon fiber bundle in a state of being opened on a guide roller.

Any of the guide rollers 23 to 26 is a flat roller. As illustrated in FIG. 3, a roller length (a length in an axial direction) L1 of the guide roller 23 is set to be sufficiently larger than a width WL of the carbon fiber bundle 12 that is opened. With regard to the guide rollers 24 to 26, as in the guide roller 23, the roller length is set to be sufficiently larger than the width WL of the opened carbon fiber bundle 12. For example, the guide rollers 23 to 26 have the same size, and the roller length L1 is set to 100 mm, and a diameter (external diameter) of the rollers is set to 50 mm. In the opened carbon fiber bundle 12, a plurality of the carbon fibers 11 are aligned in the thickness direction (a diameter direction of the guide rollers).

Among the guide rollers 23 to 26, the guide rollers 24 and 25 are disposed in the CNT adhesion tank 22. According to this, the carbon fiber bundle 12 linearly travels between the guide rollers 24 and 25 in the dispersion 28 at a constant depth. A travelling speed of the carbon fiber bundle 12 is preferably set within a range of 0.5 to 100 m/minute. The higher the travelling speed of the carbon fiber bundle 12 is, the further productivity is improved. The lower the travelling speed is, the more effective for uniform adhesion of the CNTs 17, and more effective for suppression of entanglement of the carbon fibers 11. In addition, the less entanglement between the carbon fibers 11 is, the further uniformity of adhesion of the CNTs 17 to the carbon fibers 11 is raised. When the travelling speed of the carbon fiber bundle 12 is 100 m/minute or less, entanglement between the carbon fibers 11 is more effectively suppressed, and adhesion uniformity of the CNTs 17 can be further raised. In addition, the travelling speed of the carbon fiber bundle 12 is more preferably set within a range of 5 to 50 m/minute.

The ultrasonic wave generator 27 applies ultrasonic vibration as mechanical energy to the dispersion 28. According to this, in the dispersion 28, a reversible reaction state in which a dispersion state in which the CNTs 17 are dispersed and an aggregation state in which the CNTs 17 are aggregated vary alternately is formed. When the carbon fiber bundle 12 is caused to pass through the dispersion 28 that is in the reversible reaction state, when transitioning from the dispersion state to the aggregation state, the CNTs 17 adhere to the carbon fibers 11 due to Van der Walls force. The mass of the carbon fibers 11 is as large as 100,000 or more times the mass of the CNTs 17, energy necessary for detachment of the adhered CNTs 17 is more than energy due to the ultrasonic vibration. According to this, the CNTs 17 adhered once to the carbon fibers 11 are not peeled off from the carbon fibers 11 by the ultrasonic vibration after adhesion. Note that, since the mass is very small, the dispersion state and the aggregation state alternately vary between the CNTs 17 due to the ultrasonic vibration.

When transition from the dispersion state to the aggregation state is repetitively performed, a plurality of CNTs 17 adhere to each of the carbon fibers 11, and the structure 14 is formed. As described above, when using the CNTs 17 having a bent shape, other CNTs 17 enter a space formed between the CNTs 17 and the surfaces of the carbon fibers 11 to which the CNTs adhere, between the adhered CNTs 17, or the like, and thus more CNTs 17 adhere to the carbon fibers 11 and the structure 14 is formed.

A frequency of the ultrasonic vibration applied to the dispersion 28 is preferably 40 to 950 kHz. When the frequency is 40 kHz or higher, entanglement between the carbon fibers 11 in the carbon fiber bundle 12 is suppressed. In addition, when the frequency is 950 kHz or lower, the CNTs 17 adhere to the carbon fibers 11 in a satisfactory manner. In order to further reduce entanglement of the carbon fibers 11, the frequency of the ultrasonic vibration is preferably 100 kHz or higher, and more preferably 130 kHz or higher. In addition, the frequency of the ultrasonic vibration is more preferably 430 kHz or lower.

In addition, the present inventors found that the number of the CNTs 17 adhered to the carbon fibers 11 becomes almost the maximum while securing uniformity of adhesion of the CNTs 17 to the carbon fibers 11 when the number of times of transition from the dispersion state to the aggregation state in the CNTs 17 reaches 65,000. Note that, the maximum value of the number of the CNTs 17 adhered varies in accordance with a CNT concentration of the dispersion 28, and increases as the CNT concentration of the dispersion 28 is higher.

According to this, it is preferable to determine the travelling speed of the carbon fiber bundle 12, a travelling distance of the carbon fiber bundle 12 in the dispersion 28 (an interval between the guide rollers 24 and 25), and the frequency of the ultrasonic vibration that is applied to the dispersion 28 so that the length of a period during which the carbon fiber bundle 12 is travelling in the dispersion 28, that is, time (hereinafter, referred to as "immersion time") for which the carbon fiber bundle 12 is travelling between the guide rollers 24 and 25 becomes 65,000 or more times a cycle of the ultrasonic vibration applied to the dispersion 28. That is, it is preferable to satisfy "Ts≥65,000/fs", where fs represents the frequency of the ultrasonic vibration, and Ts second represents the immersion times. For example, when the frequency of the ultrasonic vibration is 130 kHz and the distance along which the carbon fiber bundle 12 travels in the dispersion 28 is 0.1 m, the travelling speed of the carbon fiber bundle 12 can be set to 12 m/minute or less. In addition, even in a case where the carbon fiber bundle 12 is immersed in the dispersion 28 in a plurality of times in a division manner, when a total number of immersion times is set to 65,000 or more times the cycle of the ultrasonic vibration, the number of the CNTs 17 adhered can be almost the maximum.

The carbon fiber bundle 12 is taken out from the dispersion 28 and is dried. The first sizing treatment and drying are sequentially performed with respect to the dried carbon fiber bundle 12, and thus the first sizing agent is applied to the structure 14. The first sizing treatment can be performed by a typical method.

The first sizing agent is not particularly limited, and various thermosetting resins and thermoplastic resins can be used. Examples of the thermosetting resins include an epoxy resin, a phenol resin, a melamine resin, a urea resin, unsaturated polyester, an alkyd resin, and a thermosetting polyimide, and the like. Examples of the thermoplastic resin include general-purpose resins such as polyethylene, polypropylene, polystyrene, an acrylonitrile/styrene (AS) resin, an acrylonitrile/butadiene/styrene (ABS) resin, a methacrylic resin (PMMA or the like), and vinyl chloride, engineering plastics such as polyamide, polyacetal, polyethylene terephthalate, ultrahigh molecular weight polyethylene, and polycarbonate, and super engineering plastics such as polyphenylene sulfide, polyether ether ketone, liquid crystal polymer, polytetrafluoroethylene, polyetherimide, polyarylate, and polyimide.

[Dispersion]

For example, the dispersion 28 is prepared as follows. A long CNT (hereinafter, referred to as "material CNT") are added to a dispersion medium, the material CNT is cut by a homogenizer, a shearing force, an ultrasonic disperse, or the like to obtain the CNTs 17 having a desired length, and to realize dispersion uniformity of the CNTs 17.

As the dispersion medium, water, alcohols such as ethanol, methanol and isopropyl alcohol, and organic solvents such as toluene, acetone, tetrahydrofuran (THF), methyl ethyl ketone (MEK), hexane, normal hexane, ethyl ether, xylene, methyl acetate, and ethyl acetate can be used. The dispersion 28 does not contain a dispersing agent and adhesive.

As described above, the material CNT, which is the source of the CNTs 17 having the bent shape, has the bent shape. The material CNT is manufactured as a so-called tangle in which individual material CNTs are entangled with each other, and as a so-called bundle in which the individual material CNTs are not substantially entangled or the degree of entanglement is small according to the producing method, conditions or the like, but the latter case is preferable.

Since the material CNT of the bundle is not substantially entangled, or the degree of entanglement thereof is small, even when a length of each CNT manufactured through cutting is long, CNTs can be isolated and dispersed, and thus the dispersion 28 in which the CNTs 17 satisfying the above-described length conditions are isolated and dispersed is obtained. In contrast, in the material CNT of the tangle, it is difficult to obtain the dispersion in which the CNTs are isolated and dispersed unless the length of each CNT manufactured through cutting is considerably reduced. Accordingly, when forming the structure, the CNT tends to be too short.

In the composite material 10 in this example, as described above, since CNTs having the bent shape as the CNTs 17 are caused to adhere, other CNT 17 enter a space formed between the CNTs 17 and the surfaces of the carbon fibers 11 to which the CNTs 17 adhere, between the adhered CNTs 17, or the like. According to this, more CNTs 17 adhere to the carbon fibers 11. In addition, the CNTs 17 strongly adhere to the carbon fibers 11 and the structure 14 is formed, and thus the CNTs 17 are less likely to be peeled off from the carbon fibers 11. In addition, in the carbon-fiber-reinforced molded article manufactured by using the composite material 10, the properties derived from the CNTs are further enhanced.

As described above, in the carbon-fiber-reinforced molded article prepared by using the composite material 10 as described above, the vibration damping property and a variation property (damping properties) of the elastic modulus are further improved in comparison to a carbon-fiber-reinforced molded article using a composite material in the related art. With regard to the variation property of the elastic modulus, an increase in the elastic modulus of the carbon-fiber-reinforced molded article is suppressed with respect to an increase in a collision speed to the carbon-fiber-reinforced molded article.

A concentration of the CNTs 17 in the dispersion 28 is preferably within a range of 0.003 to 0.3 wt %. The concentration of the CNTs 17 in the dispersion 28 is more preferably 0.005 to 0.2 wt %.

[Prepreg]

Figure 4:
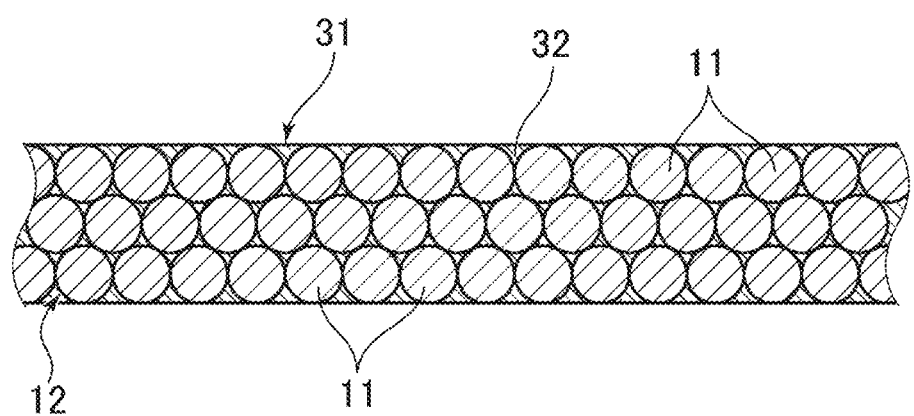
FIG. 4 is an explanatory diagram schematically illustrating a configuration of a prepreg.

In FIG. 4, a prepreg 31 includes the carbon fibers 11 in which the structure 14 of the carbon fiber bundle 12 is formed, and an uncured matrix resin 32 that is impregnated into the carbon fiber bundle 12. The prepreg 31 is formed by impregnating the opened composite material 10 with the matrix resin 32, and is formed in a strip shape on which a plurality of the carbon fibers 11 are arranged in a thickness direction. In the composite material 10, entanglement between the carbon fibers 11 in the carbon fiber bundle 12 substantially does not exist, and thus when producing the prepreg 31, the carbon fibers 11 are likely to spread uniformly. The fiber axis direction of each of the carbon fibers 11 of the prepreg 31 is aligned in the same direction (a direction perpendicular to a paper surface in FIG. 4). The prepreg 31 can be made wide by arranging a plurality of the opened composite materials 10 in a line in a width direction (opened direction).

As the matrix resin 32, various thermosetting resins or thermoplastic resins can be used without particular limitation. Examples of the thermosetting resins include an epoxy resin, a phenol resin, a melamine resin, a urea resin, unsaturated polyester, an alkyd resin, thermosetting polyimide, a cyanate ester resin, a bismaleimide resin, a vinyl ester resin, and the like. In addition, examples of the thermoplastic resins include general-purpose resins such as polyethylene, polypropylene, polyvinyl chloride, polystyrene, an acrylonitrile/styrene (AS) resin, an acrylonitrile/butadiene/styrene (ABS) resin, and a methacrylic resin (PMMA or the like), engineering plastics such as polyamide, polyacetal, polyethylene terephthalate, ultrahigh molecular weight polyethylene, polycarbonate, and a phenoxy resin, and super engineering plastics such as polyphenylene sulfide, polyether ether ketone, polyether ketone ketone, liquid crystal polymer, polytetrafluoroethylene, polyetherimide, polyarylate, and polyimide.

[Carbon-Fiber-Reinforced Molded Article]

Figure 5:
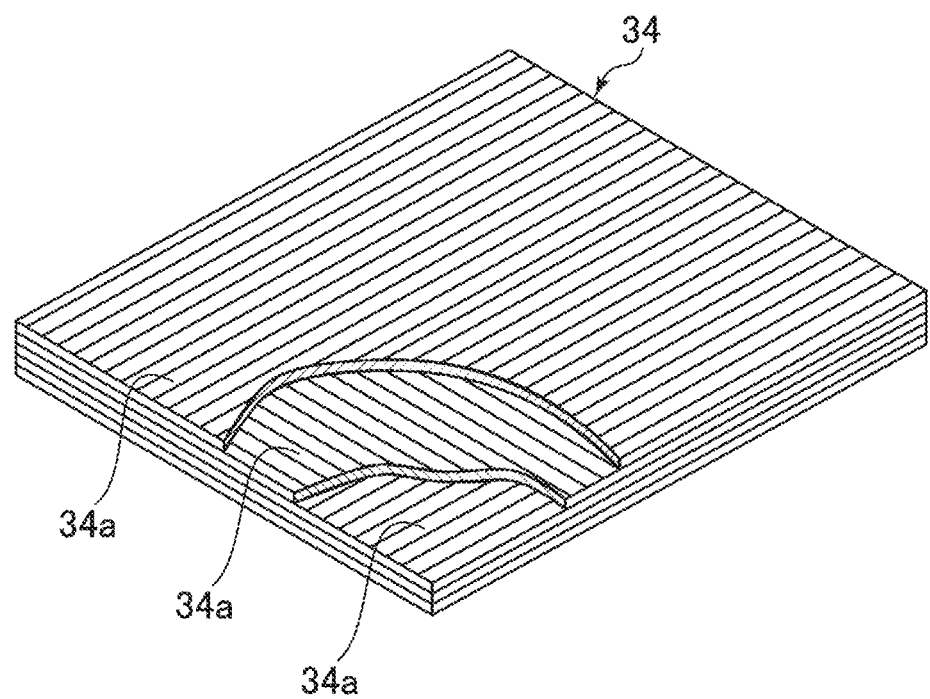
FIG. 5 is an explanatory diagram schematically illustrating a carbon-fiber-reinforced molded article.

The carbon-fiber-reinforced molded article is manufactured by heating and curing the matrix resin 32 while pressing the prepreg 31. When pressing and heating a laminated body obtained by laminating a plurality of sheets of the prepregs 31, a carbon-fiber-reinforced molded article in which the laminated body is integrally formed can be also obtained. In this case, a fiber axis direction of the carbon fibers 11 in the laminated body can be set to an arbitrary direction for every layer corresponding to the prepreg 31. In a carbon-fiber-reinforced molded article 34 illustrated in FIG. 5, in a plurality of layers 34a corresponding to the prepreg 31, fiber axis directions of the carbon fibers 11 are orthogonal to each other in upper and lower layers 34a. As a heating and pressing method, a press molding method, an autoclave molding method, a bagging molding method, a sheet winding method, a filament winding method, an internal pressure molding method, and the like can be used. A volume content of the matrix resin 32 is preferably 10% to 40%, more preferably 15% to 33%. The matrix resin 32 preferably has an elastic modulus of approximately 2 to 5 GPa.

In the embodiment, fixing of the CNTs to the surfaces of the carbon fibers is obtained due to coupling between the carbon fibers and the CNTs by Van der Waals force, but in addition to this, a binding part that reinforces fixing of the CNTs to the surfaces of the carbon fibers may be formed. For example, the binding part is an epoxy resin that is cured in a state of entering a gap formed between respective surfaces of the carbon fibers and the CNTs directly adhered to the carbon fibers. For example, the epoxy resin is dissolved in a solvent such as toluene, xylene, methyl ethyl ketone, methyl isobutyl ketone (MIBK), butanol, ethyl acetate, or butyl acetate to obtain a solution, and the carbon fiber bundle including the carbon fibers in which the structure is formed is immersed in the solution. Then, the resultant carbon fiber bundle is heated. According to this, the uncured epoxy resin enters the gap formed between the respective surfaces of the carbon fibers and the CNTs, and the epoxy resin is cured.

Note that, when forming the binding part, an epoxy resin solution that is a material of the binding part may be used in a state of an emulsion. For example, an emulsifier such as a nonionic emulsifier may be added to the solution obtained by dissolving the epoxy resin in the solvent to obtain the emulsion. In addition to the epoxy resin, the binding part may be formed by, for example, a phenol resin, a polyurethane resin, a melamine resin, a urea resin, a polyimide resin, or the like. In addition, a silane coupling agent or inorganic adhesive may also be used as the binding part.

The CNTs may be partially fixed to the surfaces of the carbon fibers. In this configuration, the cured fixing resin part is scattered on the surfaces of the carbon fibers, and some CNTs forming the structure are fixed to the surfaces of the carbon fibers by the fixing resin part. It is preferable that a ratio of the surfaces of the carbon fibers which are covered by the fixing resin part on the surfaces of the carbon fibers is within a range of 7% to 30%. The composite material in which some CNTs are fixed by the fixing resin part that is scattered as described above can sufficiently exhibit the effect of the CNTs, and it is possible to further enhance resistance to progression of interlayer peeling cracks in the carbon-fiber-reinforced molded article using the composite material.

For example, the fixing resin part can be formed by applying an emulsion-type treatment liquid containing a liquid droplet-shaped resin (second sizing agent) having a particle size of 0.05 to 1 μm, and curing the resin. The particle size can be obtained by a laser analysis method. Examples of the resin include a reactive resin. The reactive resin is a resin having a functional group that is highly reactive with a carboxylic group, and specifically, a resin having an oxazoline group. Examples of the reactive resin emulsion include Epocross (manufactured by NIPPON SHOKUBAI CO., LTD.). In the Epocross, a concentration of the reactive resin is approximately 40% by mass.

Second Embodiment

A composite material of a second embodiment includes a plurality of fixing resin parts which partially fix some of a plurality of CNTs constituting a structure to surfaces of carbon fibers. Configurations other than a configuration to be described below in detail are similar as in the first embodiment. Accordingly, the same reference numeral will be given to substantially the same members, and detailed description thereof will be omitted.

[Composite Material]

Figure 6:
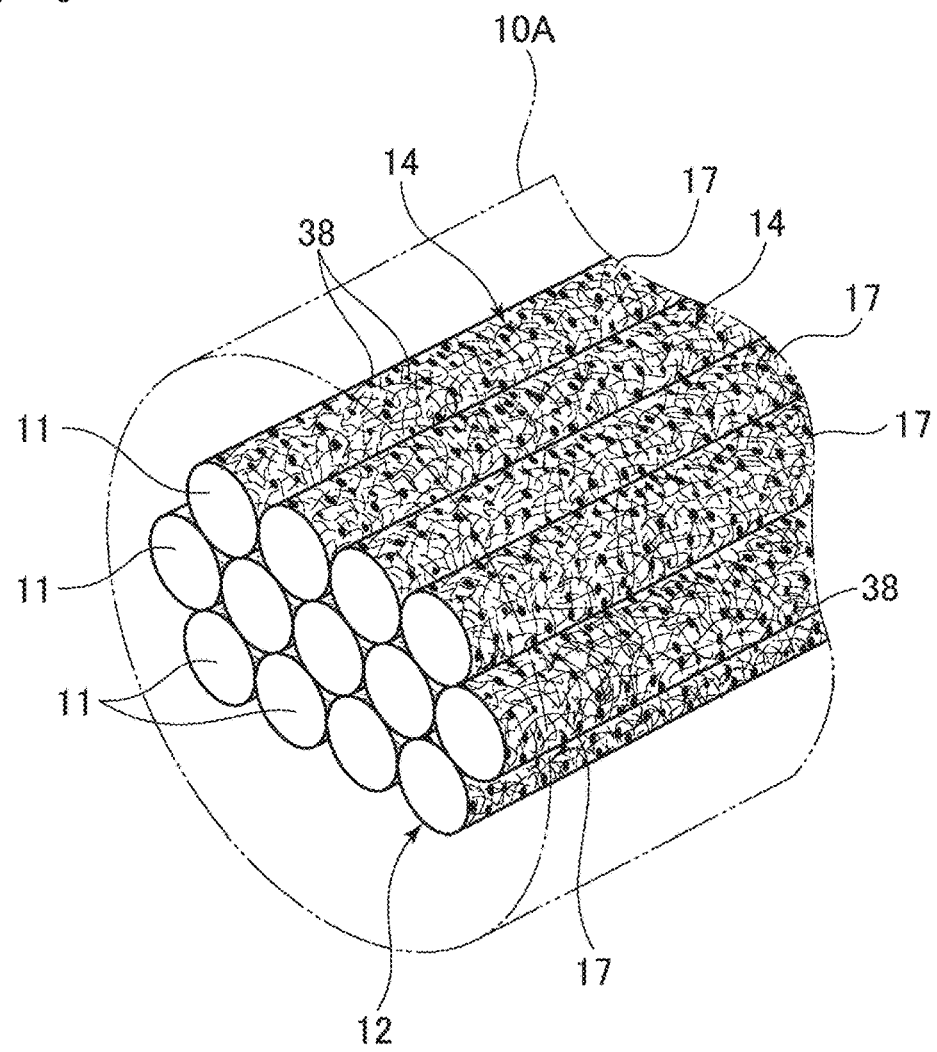
FIG. 6 is an explanatory diagram illustrating a configuration of a composite material according to a second embodiment.

In FIG. 6, a composite material 10A includes a carbon fiber bundle 12 in which a plurality of continuous carbon fibers 11 are arranged. A structure 14 is formed on a surface of each of the carbon fibers 11. The structure 14 includes a plurality of carbon nanotubes (hereinafter, referred to as "CNTs") 17. In addition, the composite material 10A is provided with a plurality of fixing resin parts 38 which partially fix some of the plurality of CNTs 17 constituting the structure 14 to the surfaces of the carbon fibers 11. Typically, the composite material 10A can be used in the carbon-fiber-reinforced molded article.

Even in this example, since the CNTs 17 having the bent shape are used, it is possible to further increase the number of the CNTs 17 adhered to the carbon fibers 11 in comparison to the case of using CNTs with high linearity. According to this, the structure 14 has a structure in which a plurality of CNTs 17 are entangled, a thickness is large, and the CNTs 17 are knitted like a non-woven fabric fiber. The carbon fibers 11 are similar as in the first embodiment.

Figure 7:
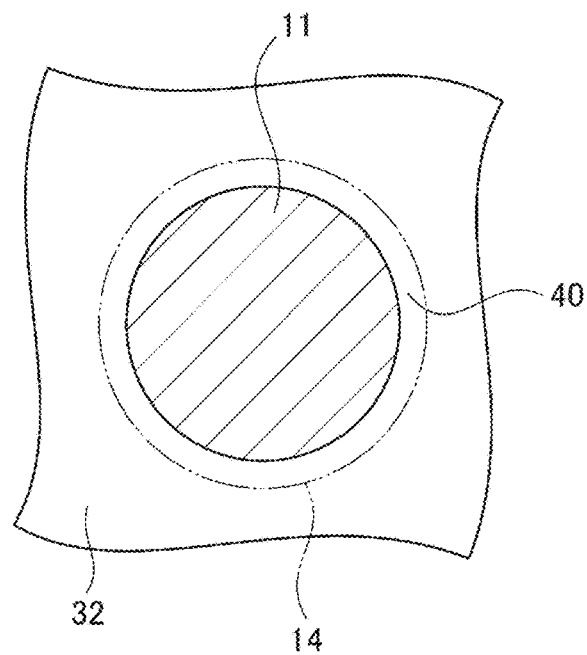
FIG. 7 is an explanatory diagram illustrating a composite region in which a structure and a matrix resin are combined.

As illustrated in FIG. 7, in a carbon-fiber-reinforced molded article manufactured from the composite material 10A as described above, a composite region 40 in which the structure 14 is impregnated with a matrix resin 32 and the matrix resin is cured is formed at the periphery of each of the carbon fibers 11. In addition, the CNTs 17 floating from a surface of the structure 14 exist in the structure 14, and thus a concentration (density) of the CNTs 17 in the composite region 40 is lowered as being spaced apart from the carbon fiber 11. In the composite region 40, the CNTs 17 and the matrix resin 32 are combined, and thus high strength and high flexibility derived from the CNTs 17 are provided. In addition, the composite region 40 has an effect of relieving stress concentration, a constraining effect of suppressing displacement of the carbon fiber 11, an effect of efficiently absorbing mechanical energy applied from the outside, and the like.

Properties of the carbon-fiber-reinforced molded article which are derived from the CNTs 17 are exhibited due to properties of the composite region 40 described above, the effects due to the composite region 40, and the like. As described above, since the structure 14 has a structure in which the number of the CNTs 17 adhered to the carbon fiber 11 is large, and the CNTs 17 are knitted like a non-woven fabric fiber, properties of the carbon-fiber-reinforced molded article which are derived from the CNTs are higher in comparison to a composite material in which a structure like the structure 14 is not formed.

Preferable shape, length, average diameter, layer structure, and the like of the CNTs 17 are similar as in the first embodiment. In addition, a preferable range of the weight ratio R that is a weight of the CNTs 17 adhered per unit weight of the carbon fibers 11 and a preferable range of the standard deviation s of the weight ratio R are also similar as in the first embodiment. Note that, in measurement of the weight ratio R, an object obtained by removing the fixing resin part 38 from the carbon fiber bundle 12 may be used, and the carbon fiber bundle 12 may be used as is.

Figure 8:
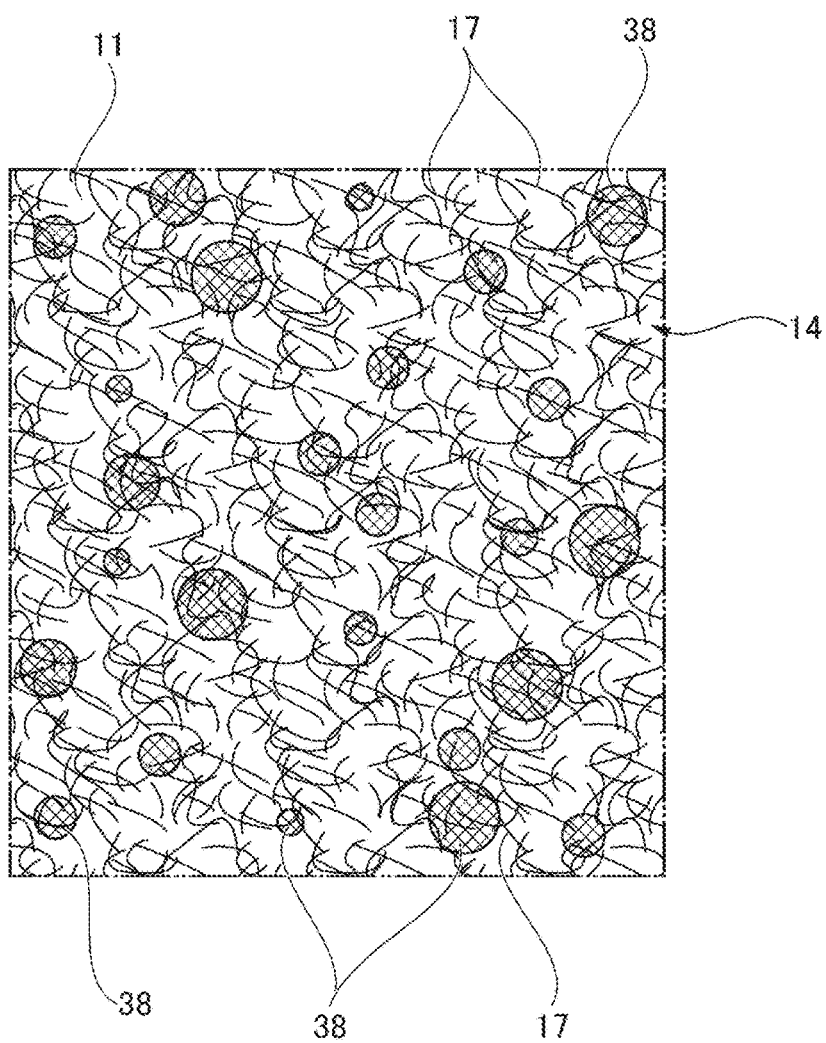
FIG. 8 is an explanatory diagram illustrating a fixing resin part on a surface of the structure.

As illustrated in FIG. 8, the carbon fibers 11 are provided the plurality of fixing resin parts 38. The fixing resin parts 38 are formed by curing a resin into particles reaching the surface of the carbon fibers 11 from the surface of the structure 14. The fixing resin parts 38 are fixed to the surface of the carbon fiber 11 to which bottom portions of the fixing resin parts 38 adhere, and are fixed to the CNTs 17 of the structure 14 that covers the carbon fiber 11 at a portion above the bottom portions. As described above, the fixing resin parts 38 are fixed to both the surface of the carbon fiber 11 and a part of the CNTs 17, thereby fixing the CNTs 17 to the carbon fiber 11.

Figure 9:
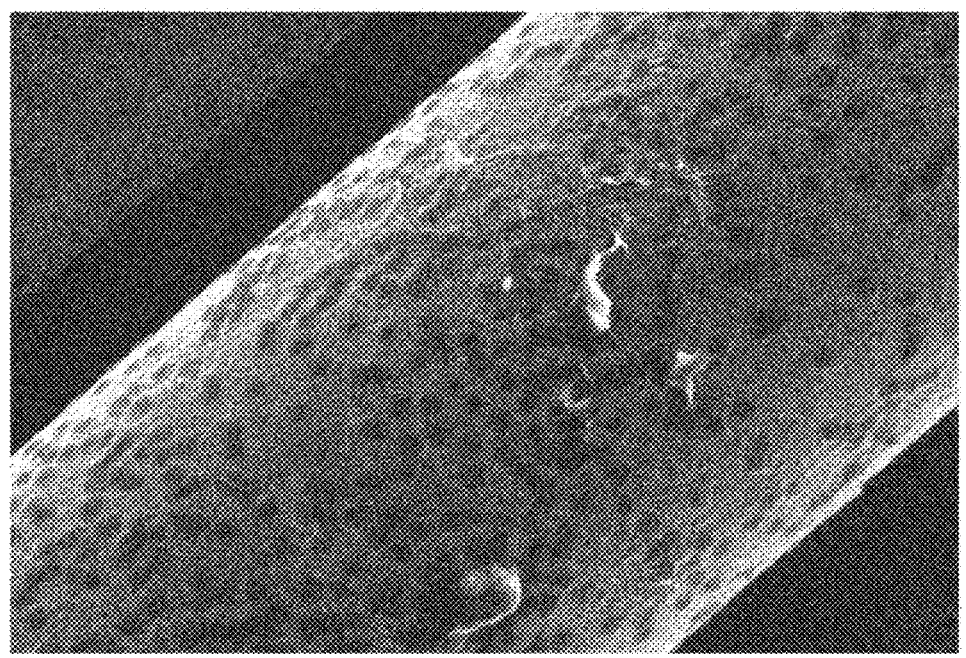
FIG. 9 is a SEM photograph illustrating the fixing resin part on the surface of the structure.

As described above, the fixing resin parts 38 partially fix some of the plurality of CNTs 17 constituting the structure 14 to the surface of the carbon fiber 11, are provided to be scattered on the surface of the carbon fiber 11, and fix the CNTs 17 of the structure 14 for every site. Upper portions of the fixing resin parts 38 provided to be scattered as described above are exposed to the surface of the structure 14, and thus the fixing resin parts are observed in a state of being scattered on the surface of the structure 14. A SEM photograph of the carbon fiber 11 provided with the structure 14 and the fixing resin parts 38 is illustrated in FIG. 9. On the SEM photograph, scattered black disk-shaped regions are the fixing resin parts 38.

Figure 10:
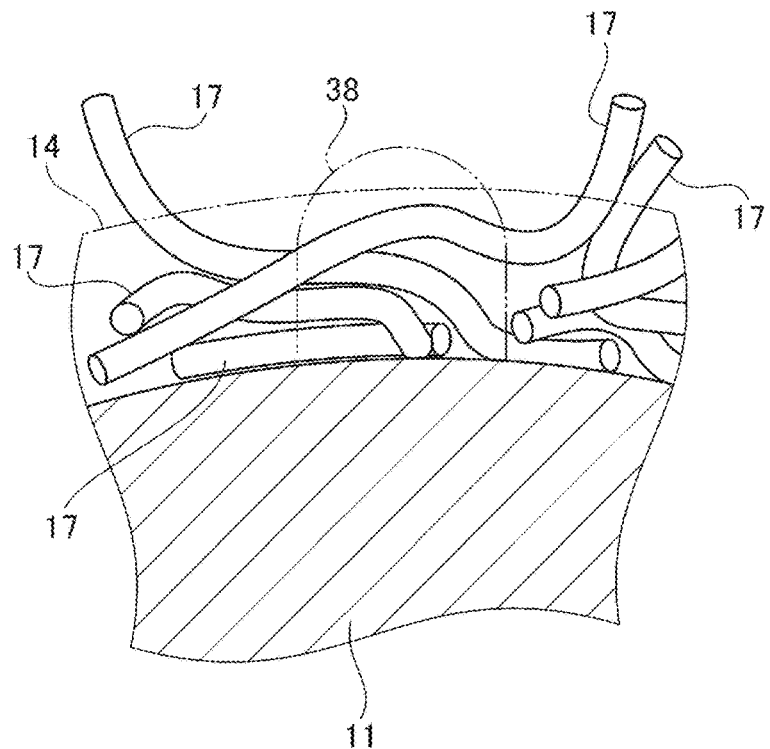
FIG. 10 is an explanatory diagram illustrating a state in which the carbon nanotube is fixed by the fixing resin part.

As schematically illustrated in FIG. 10, the fixing resin parts 38 are formed on a range reaching the surface of the carbon fiber 11 from the surface of the structure 14 in a diameter direction of the carbon fiber 11 (a thickness direction of the structure 14), are fixed to the surface of the carbon fiber 11, and are fixed to portions of the CNTs 17 included at the inside.

In the CNTs 17 of the structure 14, a portion adhered to the surface of the carbon fiber 11, and a portion that overlaps other CNTs 17 or a portion interposed between the other CNTs 17 is fixed to the fixing resin parts 38. In addition, in the CNTs 17, an end or a central portion is fixed to the fixing resin parts 38. As described above, the CNTs 17 which are fixed to the fixing resin parts 38 are strongly fixed to the carbon fiber 11 due to the fixing resin parts 38. As described above, a portion of the CNTs 17, which is not covered with the fixing resin parts 38, adheres to the surface of the carbon fiber 11 by Van der Waals force. Accordingly, the portion may be separated from the surface of the carbon fiber 11 and float therefrom due to an operation of a force weaker in comparison to the portion that is fixed by the fixing resin parts 38, and may move on the surface of the carbon fiber 11. In addition, on the surface of the structure 14, the portion that is not fixed by the fixing resin parts 38 of the CNTs 17 enters a free state in which the portion is separated from the surface of the structure 14 and floats from the surface.

As described above, since the CNTs 17 of the structure 14 are fixed by the fixing resin parts 38, partial detachment of the structure 14 is further suppressed in comparison to a case where the CNTs 17 of the structure 14 are not fixed by the fixing resin parts 38. According to this, properties of the carbon-fiber-reinforced molded article which are derived from the CNTs can be further enhanced. The CNTs 17 of the fixing resin part 38 are constrained to the surface of the carbon fiber 11, and thus it is easy to cause a current to flow from the carbon fiber 11. As a result, the CNTs 17 can attribute to an improvement of conductivity of the carbon-fiber-reinforced molded article.

Note that, all of the CNTs 17 constituting the structure 14 may be fixed to the carbon fiber 11 by the fixing resin parts 38, but it is sufficient if some of the CNTs 17 are fixed. That is, at least a part of the CNTs 17 constituting the structure 14 may be fixed by the fixing resin parts 38. The CNTs 17 form a membrane as the structure 14 having a non-woven fabric structure, and thus when at least a part of the CNTs 17 constituting the structure 14 is fixed, performance can be exhibited.

In the fixing resin parts 38, a number ratio N that is the number per 5 μm square on the surface (outer peripheral surface) of the structure 14 in plan view is preferably within a range of 27 to 130. In addition, on the surface of the structure 14 in plan view, an area ratio S of the fixing resin part 38 is preferably within a range of 6% to 45%. On the surface of the structure 14 in plan view, the area ratio S is a ratio of an area of the surface of the structure 14 which is covered by the plurality of the fixing resin parts 38 to a surface area of the structure 14. When the surface area of the structure 14 in a predetermined range is set as S2, and the area of the surface of the structure 14 which is covered by the fixing resin parts 38 in a predetermined range is set as S1, the area ratio S is obtained as "S=S1/S2×100(%)". In plan view, a peripheral surface of the structure 14 is observed in a planar manner from a direction orthogonal to the fiber axis direction of the carbon fiber 11.

Note that, since the thickness of the structure 14 is sufficiently smaller than a radius of the carbon fiber 11, the surface of the structure 14 can be regarded as the surface of the carbon fiber 11. In addition, with regard to the fixing resin parts 38, the area of the surface of the structure 14 which is covered by the fixing resin parts 38 and the area of the surface of the carbon fiber 11 which is covered by the fixing resin parts 38 can be regarded to be the same as each other. Accordingly, the number ratio N and the area ratio S can be regarded as the number ratio that is the number of the fixing resin parts 38 per 5 μm square on the surface (outer peripheral surface) of the carbon fiber 11 in plan view, and a ratio of the area of the surface of the carbon fiber 11 which is covered by the fixing resin parts 38 to the surface area of the carbon fiber 11 on the surface of the carbon fiber 11 in plan view, respectively.

Figure 11:
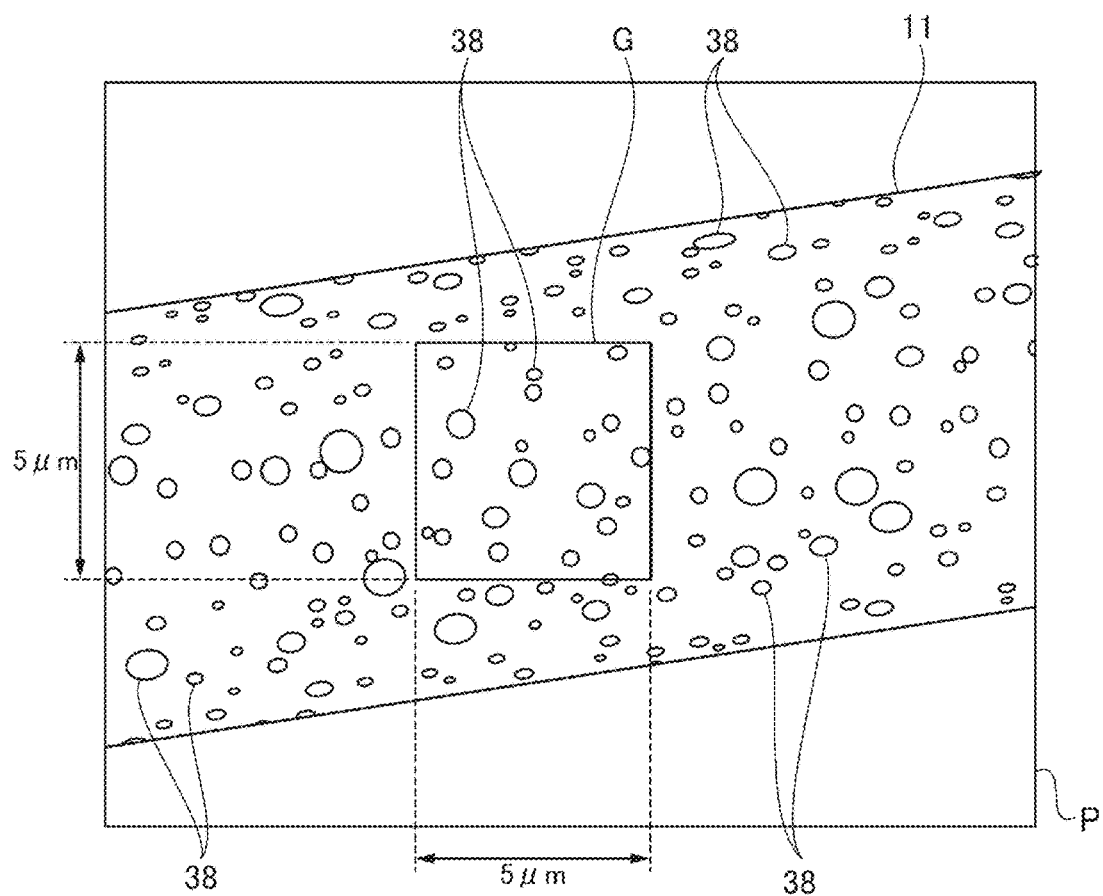
FIG. 11 is an explanatory diagram illustrating an observation frame that is set to the surface of the structure in plan view state.

Actually, when the number ratio N is counted, and the area ratio S is obtained, for example, as illustrated in FIG. 11, the structure 14 formed on the peripheral surface of the carbon fiber 11 is observed in a planar manner by using a SEM photograph P. In addition, an observation frame G of 5 μm square is set on a planar observation image of the structure 14 in the SEM photograph P, the number of the fixing resin parts 38 in the observation frame G is counted, and the number is set as the number ratio N. Similarly, the area ratio S can be calculated by obtaining an area of each of the fixing resin parts 38 observed in the observation frame G, and setting a total area of the fixing resin parts 38 as the area S1, and the area of the observation frame G as the surface area S2. Note that, the observation frame G may be set by making the center of the observation frame G and the center of the carbon fiber 11 in a diameter direction match each other.

When the number ratio N and the area ratio S are increased, the CNTs 17 can be reliably fixed to the surface of the carbon fiber 11, and partial detachment of the structure 14 can be reduced. In addition, when the number ratio N and the area ratio S are decreased, a portion of the CNTs 17 which is not fixed by the fixing resin parts 38 increases, and the degree of the CNTs 17 and the degree of the structure 14 can be raised.

When the number ratio N is 27 or more, or the area ratio S is 6% or more, the CNTs 17 can be reliably fixed to the carbon fiber 11 by the fixing resin parts 38, the effect of reducing partial detachment of the structure 14 is reliably obtained, and properties of the carbon-fiber-reinforced molded article which are derived from the CNTs can be enhanced. In addition, when the number ratio N is 130 or less or the area ratio S is 45% or less, the CNTs 17 which are entirely covered with the fixing resin parts 38 can be sufficiently reduced. According to this, the properties of the carbon-fiber-reinforced molded article which are derived from the CNTs, particularly, the effect based on floating of some of the CNTs 17 from the surface of the structure 14 is reliably obtained. It is preferable that both the number ratio N and the area ratio S are set within the above-described ranges in combination.

As to be described later, under constant conditions, the area ratio S can be increased or decreased in approximately proportional to the number ratio N, and the number ratio N and the area ratio S can simultaneously satisfy the conditions. Note that, in a case where the area ratio S is satisfied, the total area of the fixing resin parts 38 in 5 μm square on the surface of the structure 14 in plan view becomes within a range of 1.5 to 11.25 μm$^2$.

On the surface of the structure 14A, a substantial area per one of the fixing resin parts 38 is preferably set within a range of 0.03 to 1.12 μm$^2$. When an area of each of the fixing resin parts 38 is 0.03 μm$^2$ or more, a fixing strength of reliably fixing the CNTs 17 to the surface of the carbon fiber 11 is obtained. Even in this case, the effect of reducing partial detachment of the structure 14 is reliably obtained. When the area of each of the fixing resin parts 38 is 1.12 μm$^2$ or less, the degree of freedom of the CNTs 17 is sufficiently obtained.

The area ratio S and the number ratio N of the fixing resin parts 38 in plan view, or the substantial area of each of the fixing resin parts 38 can be obtained by using image analysis software (for example, Winroof2015 (manufactured by MITANI CORPORATION)).

As described above, in the carbon-fiber-reinforced molded article manufactured from the composite material 10A including the structure 14 including the CNTs 17 having the bent shape, the properties derived from the CNTs 17 are further improved in comparison to the related art. Specific examples of the improved properties derived from the CNTs 17 include electrical conductivity, thermal conductivity, interlayer peeling strength (interlayer fracture toughness), an elastic modulus, speed dependency (variation property) of the elastic modulus, vibration damping property, a repetitive bending fatigue property, a damage reducing effect against impact, compressive strength, and the like in the carbon-fiber-reinforced molded article. In addition, since the plurality of fixing resin parts 38 are provided in the structure 14, partial detachment of the structure 14 is suppressed as described above, and the structure 14 is not peeled off from the surface of the carbon fiber 11 even in a process such as combining with a matrix resin with high viscosity or the like. Accordingly, the properties of the carbon-fiber-reinforced molded article are further improved.

Note that, as described above, since the fixing resin parts 38 are provided, even in the case of using a combining process with the matrix resin 32 with high viscosity, or even in the case of using a molding method such as pultrusion in which the carbon fibers are impregnated with the matrix resin and are inserted into a mold to be molded into a predetermined cross-sectional shape, and then the matrix resin is cured, peeling-off or detachment of the structure 14 from the surface of the carbon fiber 11 is prevented. According to this, when providing the fixing resin parts 38, it is effective to improve the properties of the carbon-fiber-reinforced molded article, to widen an application range of the process such as the combining and the molding method, and to increase the kinds of resins that can be used as the matrix resin 32.

In the structure 14, since the plurality of CNTs 17 are connected to each other without intervening materials on surfaces thereof, the composite material 10A exhibits the performance of the electrical conductivity and the thermal conductivity derived from the CNTs. Since the structure 14 includes more CNTs 17, and electrical resistance and thermal resistance are reduced, and thus in the composite material 10A, higher electrical conductivity and thermal conductivity are obtained.

As described above, due to the high strength and flexibility of the composite region 40, stress relaxation in the composite region 40, and the like, the interlayer peeling strength of the carbon-fiber-reinforced molded article using the composite material 10A is improved, and progression of the interlayer peeling is suppressed. That is, in the carbon-fiber-reinforced molded article, aperture mode (mode I) interlayer fracture toughness in initiation of peeling crack progression and during progression of the crack is improved, and interlayer fracture toughness values GIC and GIR become high.

The elastic modulus of the carbon-fiber-reinforced molded article using the composite material 10A can be raised by the constraining effect of suppressing displacement of the carbon fiber 11 due to the composite region 40. In addition, in the carbon-fiber-reinforced molded article, due to the constraining effect due to the composite region 40 between the carbon fibers, an increase in the elastic modulus of the carbon-fiber-reinforced molded article is suppressed with respect to an increase in a collision speed to the carbon-fiber-reinforced molded article. As a result, the speed dependency of the elastic modulus decreases.

The vibration damping property (damping properties) of the carbon-fiber-reinforced molded article using the composite material 10A is improved because energy such as vibration propagating between the carbon fibers 11 is absorbed and damped by friction of the composite region 40. The repetitive bending fatigue properties of the carbon-fiber-reinforced molded article using the composite material 10A is improved by the interlayer peeling strength improving effect due to inclusion of the structure 14, the mechanical energy absorbing effect due to the composite region, and the like.

In addition, the compressive strength of the carbon-fiber-reinforced molded article using the composite material 10A is improved. That is, in the carbon-fiber-reinforced molded article, when being compressed, minute buckling is less likely to occur. The reason for this is because a difference in the elastic modulus between the carbon fibers and the matrix resin is large in the carbon-fiber-reinforced molded article in which the CNTs do not adhere to the carbon fibers in the related art, and thus stress concentration occurs, and fracture occurs at the interface between the carbon fibers and the matrix resin. In contrast, in the carbon-fiber-reinforced molded article using the composite material 10A, the difference in the elastic modulus between the carbon fibers 11 and the matrix resin 32 is relieved due to the composite region 40. Accordingly, fracture occurs in the matrix resin 32 between the carbon fibers 11. As a result, the compressive strength is improved.

In addition, in the carbon-fiber-reinforced molded article using the composite material 10A, a repulsive force is improved, that is, a repulsive coefficient is improved. This is obtained by the constraining effect due to the composite region 40 between the carbon fibers.

[Method for Manufacturing Composite Material]

A process of manufacturing the composite material 10A is the same as in the first embodiment except that a second sizing treatment of forming the fixing resin parts 38 is performed instead of the first sizing treatment of causing the first sizing agent to adhere to the surface of the structure 14. That is, in the carbon fiber bundle 12, the fixing resin parts 38 are formed by performing the second sizing treatment with respect to the carbon fiber bundle 12 that is dried after being taken out from the dispersion 28 (refer to FIG. 2). The second sizing treatment may be set to a treatment corresponding to a material that becomes the fixing resin parts 38 or a type of the material.

As a preferable method of the second sizing treatment, a method using an emulsion type treatment liquid (hereinafter, referred to as "sizing liquid") obtained by dispersing an uncured resin (polymer) that becomes the fixing resin parts 38 in a dispersion medium in a liquid droplet shape can be exemplified. In the method, an adhesion treatment of causing the resin to adhere to the carbon fiber bundle 12 by bringing the carbon fiber bundle 12 (carbon fibers 11) that is opened into contact with the sizing liquid, and a curing treatment of evaporating the dispersion medium after the adhesion treatment and curing the resin to form the fixing resin parts 38 are sequentially performed.

As the resin in the sizing liquid, a resin having a curing property, that is, a curable resin is used. The curable resin may be any of a thermosetting resin, a reactive curing resin, and the like. Note that, a cured resin obtained through curing of the curable resin may be a thermoplastic resin. Specific examples of the thermoplastic resin include an epoxy resin, a urethane resin, a urea resin, a polyimide resin, vinyl acetate, an acrylic resin, an olefin resin, vinyl chloride, a phenol resin, a melamine resin, a rubber-based resin, a silicon-based resin, inorganic adhesive, and the like, but there is no limitation to the resins. In addition, a reactive resin having a functional group that is highly reactive with a carboxylic group, specifically, an oxazoline group is also preferable. The reactive resin takes a strong bond form such as a covalent bond due to a chemical reaction with a surface group of the CNTs 17 or a surface group of the carbon fibers 11, and thus the reactive resin can more strongly fix the CNTs 17 to the surfaces of the carbon fibers 11 in comparison to a bond form such as a typical intermolecular force (Van der Waals force) and a hydrogen bond. Examples of the reactive resin emulsion include Epocross (manufactured by NIPPON SHOKUBAI CO., LTD.). In the Epocross, a concentration of the reactive resin is approximately 40% by mass.

Note that, it is preferable that the fixing resin parts 38 have high affinity with the matrix resin 32. According to this, it is preferable that the fixing resin parts 38 and the matrix resin 32 are, for example, a combination of polar resins, or a combination of non-polar resins.

Examples of the dispersion medium of the sizing liquid include water, ethanol, acetone, MEK, N,N-dimethylformamide, N,N-dimethylacetamide, N-methylpyrrolidone, toluene, xylene, and the like. The dispersion media can be used alone or in combination of two or more kinds. As the dispersion medium, water is preferable in terms of handleability and safety. The concentration of the resin in the sizing liquid after dilution is appropriately adjusted to be a target amount of the fixing resin parts 38 adhered (a ratio (% by mass) of the fixing resin parts 38 to the composite material 10A). The amount of the fixing resin parts 38 adhered to the surfaces of the carbon fibers 11 after the drying treatment is preferably within a range of 0.1% by mass to 5.0% by mass, and more preferably within a range of 0.3% by mass to 3.0% by mass.

A particle size of the resin in the sizing liquid is preferably within a range of 0.05 to 1 μm, and more preferably within a range of 0.1 to 0.4 μm. The particle size of the resin in the sizing liquid can be obtained by a laser analysis method. When the particle size of the resin in the sizing liquid is 0.05 μm or larger, the CNTs 17 can be reliably fixed to the surfaces of the carbon fibers 11, and when the particle size is 1 μm or less, the resin can reliably enter between the CNTs 17 constituting the structure 14, and the CNTs 17 can be reliably prevented from being covered with the resin. In addition, when the particle size is 0.1 μm or larger, it can be said that the particle size is a resin size sufficient for fixing the structure 14 having the non-woven fabric shape, and when the particle size is 0.4 μm or less, partial fixing of the structure 14 becomes possible.

In the case of using the emulsion type sizing liquid containing the resin having a particle size in a range of 0.1 to 0.4 μm, it is possible to form the fixing resin parts 38 each having an area in a range of 0.03 to 1.12 μm². In the case of using the sizing liquid in which the amount of the fixing resin parts 38 adhered after the curing treatment is adjusted to be 0.1% by mass to 5.0% by mass, the number ratio N can be set within a range of 27 to 130.

The adhesion treatment method using the sizing liquid is not particularly limited, and examples thereof include a roller immersion method, a roller contact method, a spray method, and the like. In addition, the curing treatment method is not particularly limited, and for example, hot wind, a hot plate, a heating roller, various infrared heaters, and the like can be used.

[Prepreg and Carbon-Fiber-Reinforced Molded Article]

A prepreg 31 (refer to FIG. 5) in this example includes the carbon fibers 11 in which the structure 14 of the carbon fiber bundle 12 and the fixing resin parts 18 are formed, and the uncured matrix resin 19 impregnated into the carbon fiber bundle 12. In addition, the carbon-fiber-reinforced molded article is manufactured by heating and curing the matrix resin 32 while pressing the prepreg 31. In this example, the prepreg 31, the carbon-fiber-reinforced molded article, and the production method are similar as in the first embodiment except that the fixing resin parts 38 are formed on each of the carbon fibers 11.

EXAMPLES

A carbon-fiber-reinforced molded article (test piece) that is used in examples to be described later was prepared through the prepreg 31 from the composite material 10 or 10A, and properties of the carbon-fiber-reinforced molded article were evaluated. The composite material 10 or 10A was manufactured in the above-described procedure. In addition, adhesion uniformity of the CNTs 17 with respect to the carbon fibers 11 of the manufactured composite material 10 was evaluated.

Figure 12:
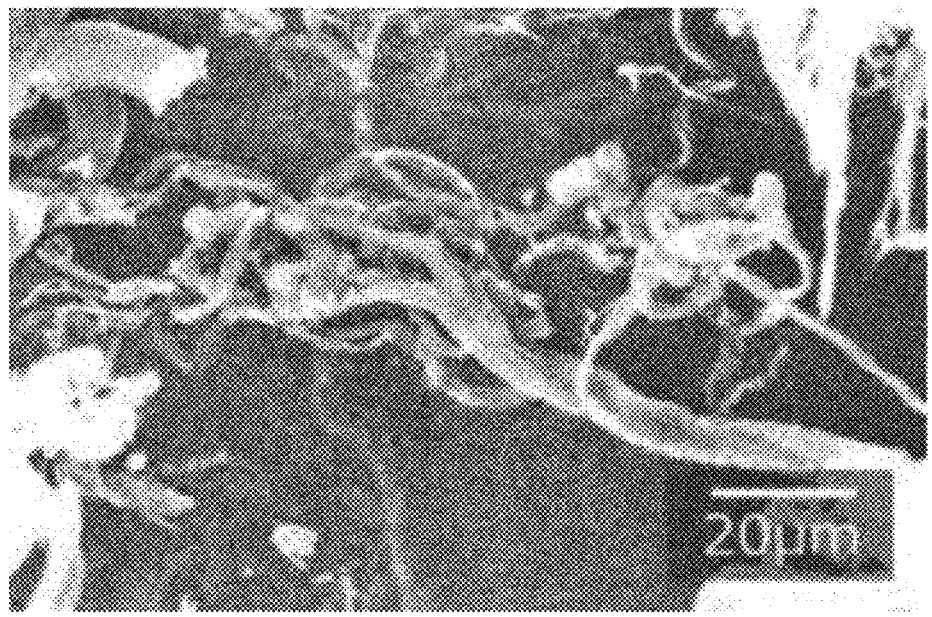
FIG. 12 is a SEM photograph illustrating a bundle form of a material CNT used in examples.
Figure 13:
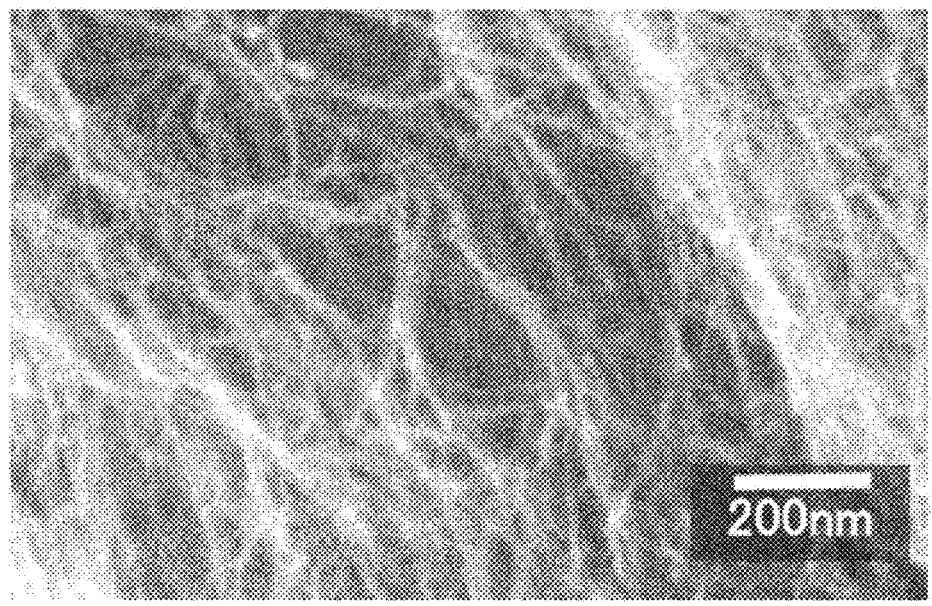
FIG. 13 is a SEM photograph illustrating a bent state of the material CNT used in examples.

The dispersion 28 that was used when producing the composite material 10 or 10A was prepared by using the bundle material CNT having the bent shape as described above. A SEM photograph of the material CNT used in preparation of the dispersion 28 is shown in FIG. 12 and FIG. 13. The material CNT was formed in a multi-layer structure, and a diameter was within a range of 3 to 10 nm. The material CNT was washed with 3:1 mixed acid of sulfuric acid and nitric acid to remove a catalytic residue, and was filtered and dried. The material CNT was added to acetone as the dispersion medium of the dispersion 28, and the material CNT was cut by using an ultrasonic homogenizer to obtain the CNTs 17. A length of the CNTs 17 in the dispersion 28 was 0.2 to 5 μm. In addition, the CNTs 17 in the dispersion 28 could be evaluated as having the bent shape.

With regard to the concentration of the CNTs 17 in the dispersion 28, when producing the carbon fiber bundle 12 to which the CNTs 17 adhere in Example 1, and when producing the composite material 10 or 10A used in carbon-fiber-reinforced molded article of Examples 2, and 4 to 7, the concentration was set to 0.12 wt % (=1, 200 wt ppm). When producing the composite material 10 used in a carbon-fiber-reinforced molded article of Example 3, the concentration was set to 0.015 wt % (=150 wt ppm). A dispersing agent or adhesive was not added to any dispersion 28.

As the carbon fiber bundle 12, T700SC-12000 (manufactured by TORAY INDUSTRIES, INC.) was used. The carbon fiber bundle 12 included 12,000 carbon fibers 11. A diameter of the carbon fibers 11 was approximately 7 μm, and a length thereof was approximately 100 m. Note that, in the carbon fiber bundle 12, the sizing agent for preventing entanglement of the carbon fibers 11 was removed from the surfaces of the carbon fibers 11 before adhesion of the CNTs 17.

In a state of being opened, the carbon fiber bundle 12 was wound around the guide rollers 23 to 26 and was travelled in the dispersion 28 contained in the CNT adhesion tank 22. A travelling speed of the carbon fiber bundle 12 was set to 1 m/minute, and ultrasonic vibration having a frequency of 200 kHz was applied to the dispersion 28 with an ultrasonic wave generator 27. Note that, immersion time for which the carbon fiber bundle 12 travels between the guide rollers 24 and 25 was set to 6.25 seconds. The immersion time corresponds to 1,250,000 cycles of the ultrasonic vibration applied to the dispersion 28.

In production of the composite material 10, the carbon fiber bundle 12 taken out from the dispersion 28 was dried, and the first sizing treatment was performed by using an epoxy resin as the first sizing agent to cause the first sizing agent to adhere to the surface of the structure 14. The carbon fiber bundle 12 subjected to the first sizing treatment was dried to obtain the composite material 10.

When producing the carbon-fiber-reinforced molded article from the composite material 10, the prepreg 31 is manufactured by opening the composite material 10 manufactured as described above, and by impregnating the composite material 10 with an epoxy resin as the matrix resin 32 in a state of being opened. A volume content of the matrix resin 32 in the prepreg 31 was 30%. In addition, the weight per unit area of the composite material 10 in the prepreg 31 was set to 180 g/m². 10 to 16 carbon fibers 11 existed in the prepreg 31 in a thickness direction. In addition, the carbon-fiber-reinforced molded article was manufactured by heating a laminated body obtained by laminating the prepreg 31 while pressing the laminated body. In the pressing and heating, an autoclave (DANDELION, manufactured by HANYUDA. CO. JP.) was used. Note that, details of the manufactured carbon-fiber-reinforced molded article will be described later.

Details of formation of the fixing resin parts 38 in the composite material 10A and production of the carbon-fiber-reinforced molded article from the composite material 10A will be described later.

In addition, a first comparison prepreg and a second comparison prepreg were manufactured for comparison to be described later. The first comparison prepreg is a prepreg using a carbon fiber bundle in which CNTs does not adhere to each carbon fiber. In addition, the second comparison prepreg is a prepreg using a carbon fiber bundle in which CNTs with high linearity is caused to adhere to each carbon fiber to form a structure. In a comparative examples, a carbon-fiber-reinforced molded article was manufactured by using the first comparison prepreg or the second comparison prepreg.

Conditions of the first comparison prepreg and the second comparison prepreg are the same as the prepreg 31 for examples except for presence or absence of adhesion of CNTs and a shape of the CNTs. Note that, a concentration of CNTs in a dispersion when producing a composite material used in the second comparison prepreg was set to 0.12 wt %. In addition, production conditions of the carbon-fiber-reinforced molded article using the first comparison prepreg or the second comparison prepreg were set to the same as in the carbon-fiber-reinforced molded article using the prepreg of each example except that the prepreg is different.

Note that, a material CNT that becomes a source of the CNTs with high linearity was manufactured in a bundle shape with high linearity by forming a catalyst film formed from aluminum and iron on a silicon substrate by using thermal CVD, dividing a catalyst metal for growth of the CNT into fine particles, and brining a hydrocarbon gas into contact with the catalyst metal in a heating atmosphere. Note that, details of this method are described, for example, in JP-A-2007-126311. The material CNT was formed in a multi-layer structure and a diameter thereof was 10 to 30 nm. A length of the CNT with high linearity in the dispersion used in adhesion to the carbon fibers was 1 to 5 μm.

Example 1

(Evaluation of Uniformity)

A. SEM Observation

Apart of the carbon fiber bundle 12 after the first sizing treatment and drying was cut and the first sizing agent was removed to obtain the carbon fibers 11. It was confirmed that a plurality of CNTs 17 adhered to each of the obtained carbon fibers 11 in a state of being uniformly dispersed through SEM observation.

With regard to a first carbon fiber 11, observation was performed at 10 sites to almost uniformly cover a range set to a length of 1 cm along a fiber axis direction. A SEM photograph of the surface of the first carbon fiber 11 is shown in FIG. 14(A) to FIG. 14(J). In addition, with regard to a second carbon fiber 11, observation was performed at 10 sites to almost uniformly cover a range set to a length of 10 cm along a fiber axis direction. A SEM photograph of the surface of the second carbon fiber 11 is shown in FIG. 15(A) to FIG. 15(J). In addition, with regard to a third carbon fiber 11, observation was performed at 10 sites to almost uniformly cover a range set to a length of 1 m along a fiber axis direction. A SEM photograph of the surface of the third carbon fiber 11 is shown in FIG. 16(A) to FIG. 16(J).

Figure 14:
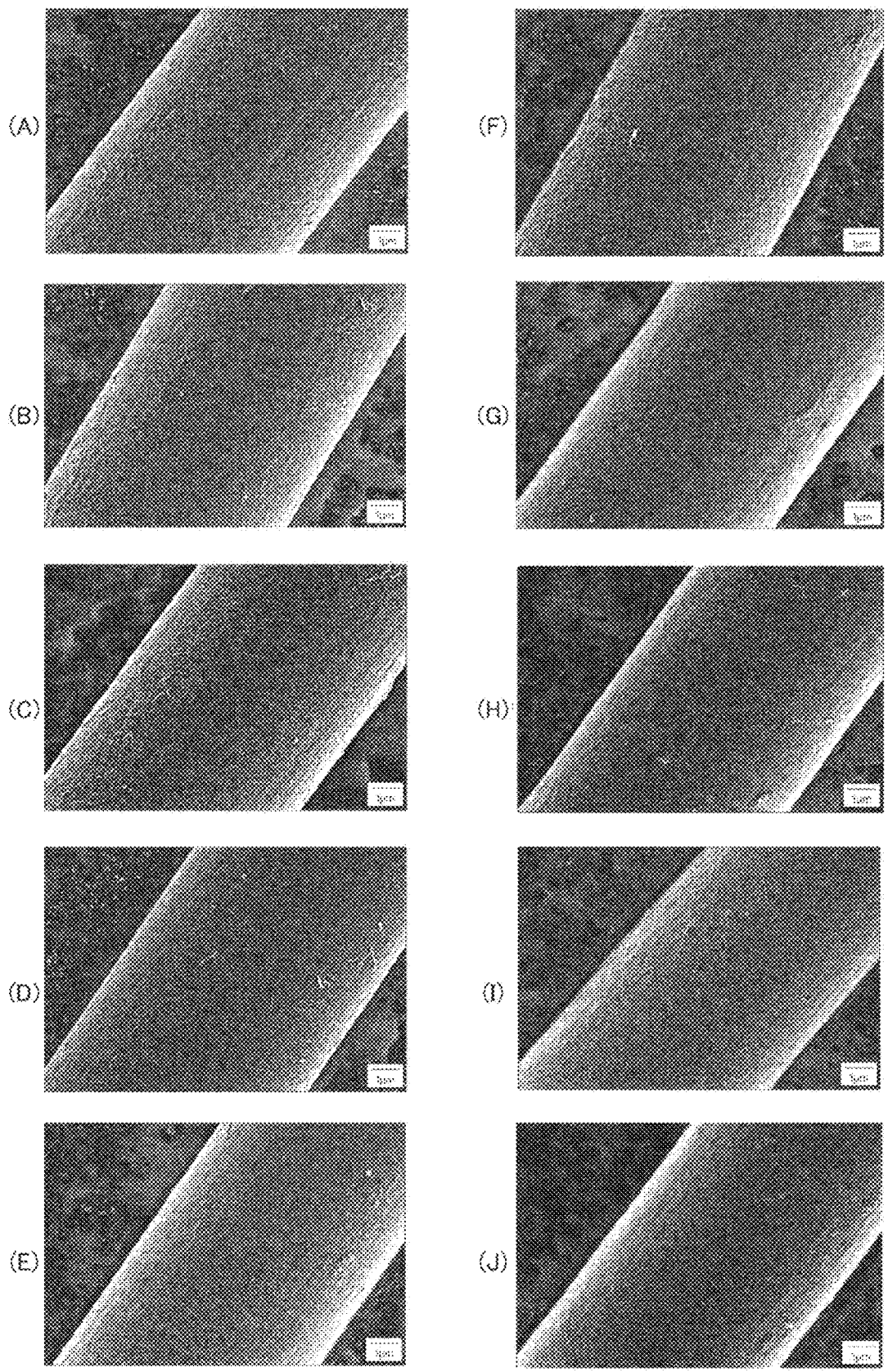
FIG. 14 is a SEM photograph illustrating an adhesion state of the CNT to the carbon fiber in a length range of 1 cm.
Figure 15:
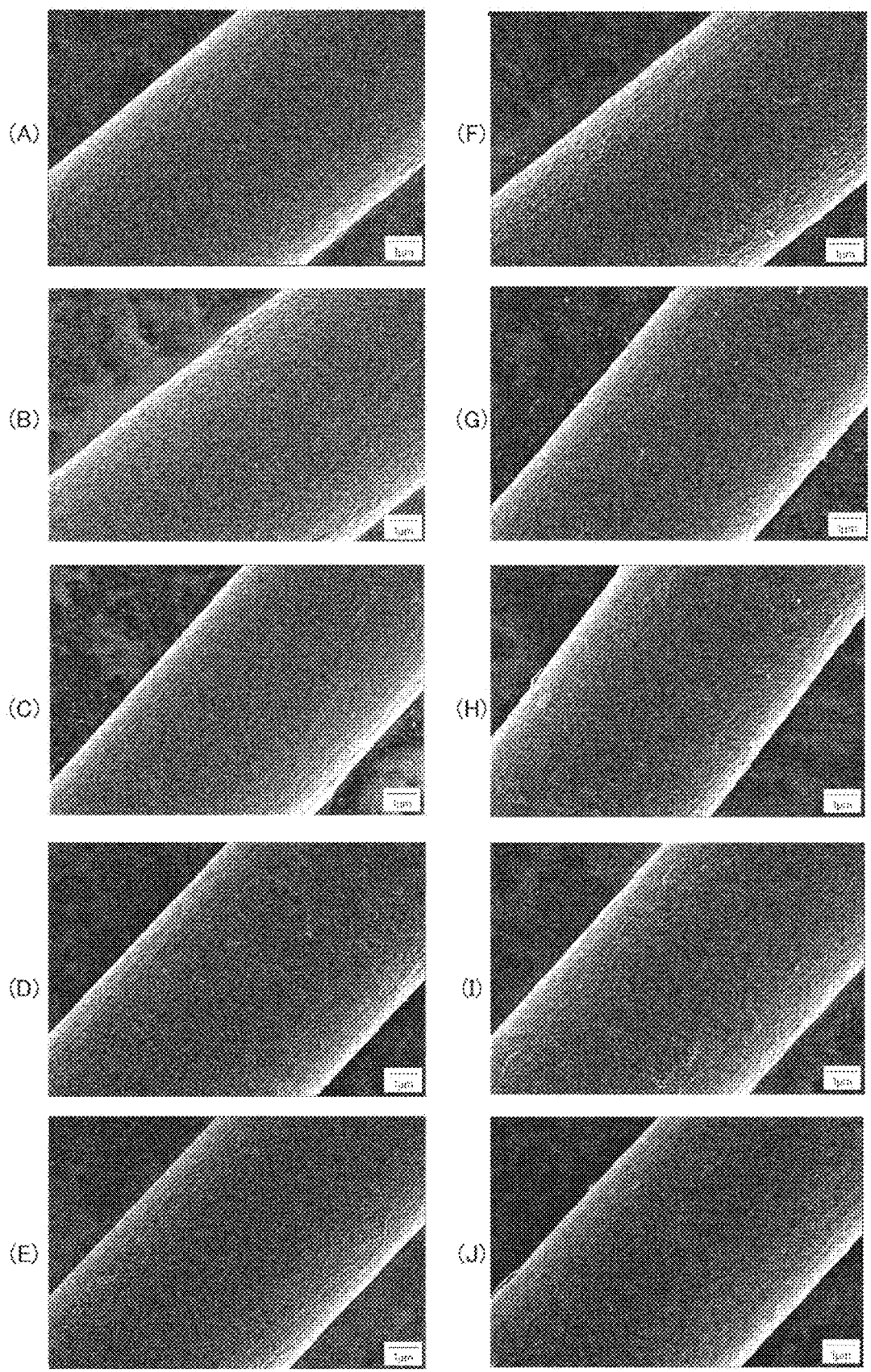
FIG. 15 is a SEM photograph illustrating the adhesion state of the CNT to the carbon fiber in a length range of 10 cm.
Figure 16:
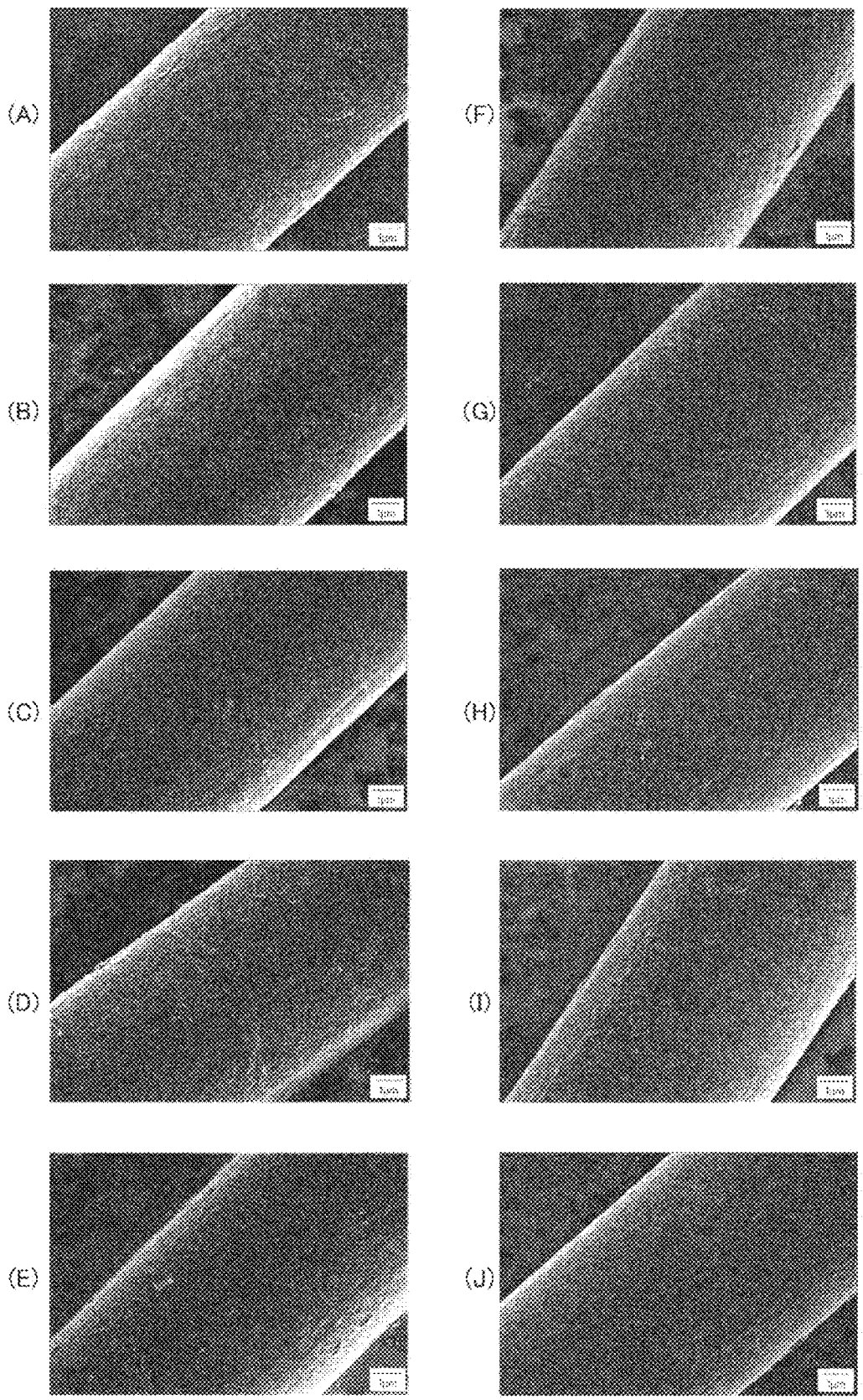
FIG. 16 is a SEM photograph illustrating the adhesion state of the CNT to the carbon fiber in a length range of 1 m.

From the SEM photographs shown in FIG. 14 to FIG. 16, it was confirmed that the CNTs 17 uniformly adhered to the carbon fibers 11 of the carbon fiber bundle 12 both in a narrow range (local) in a fiber axis direction thereof and in a wide range. In addition, it could be confirmed that more CNTs 17 adhered to the carbon fibers 11 in comparison to the case of causing linear CNTs to adhere to carbon fibers.

B. Weight Ratio

Next, uniformity was evaluated by the weight ratio R. Ten measurement sites were set so as to almost uniformly cover an evaluation range set to a length of 1 m of the carbon fiber bundle 12 after the first sizing treatment. The ten measurement sites included both ends of the evaluation range and eight sites between the both ends, and with respect to each of the measurement sites, the carbon fiber bundle 12 (12,000 carbon fibers 11) was cut in a length of approximately 3 mm (approximately 2 mg) to obtain measurement samples A1 to A10. With respect to each of the measurement samples A1 to A10, the weight ratio R was obtained as follows.

(1) Each measurement sample is put into a liquid (hereinafter, referred to as "measurement liquid") that becomes the dispersion medium of the CNTs 17. As the measurement liquid, a liquid obtained by putting a dispersing agent into acetone was used.

(2) A difference between the weight of the measurement liquid before putting the measurement sample and the weight of the measurement liquid including the measurement sample is measured, and the difference is set as the weight of the measurement sample, that is, the sum (Wa+Wb) of the CF weight Wa of the carbon fibers 11 and the CNT weight Wb of the CNTs 17 adhered to the carbon fibers 11.

(3) Ultrasonic vibration are applied to the measurement liquid including the measurement sample to completely separate the CNTs 17 adhered to the carbon fibers 11 from the carbon fibers 11 and to disperse the CNTs 17 in the measurement liquid.

(4) Absorbance (transmittance) of the measurement liquid in which the CNTs 17 are dispersed is measured by using an absorption photometer. A concentration (hereinafter, referred to as "CNT concentration") of the CNTs 17 in the measurement liquid is obtained from a measurement result obtained by the absorption photometer and a calibration curve created in advance. When the CNT concentration is set as C, the weight of the measurement liquid is set as W1, and the weight of the CNTs 17 included in the measurement liquid is set as W2, the CNT concentration is a weight percentage concentration given as "C=W2/(W1+W2)".

(5) The weight (Wb) of the CNTs 17 in the measurement liquid is obtained from the obtained CNT concentration and the weight of the measurement liquid before putting the measurement sample into the measurement liquid.

(6) The weight ratio R (=Wb/(Wa+Wb)) is calculated from the sum (Wa+Wb) of the CF weight Wa and the CNT weight Wb obtained in (2) and the weight (Wb) of the CNTs 17.

In the measurement of the absorbance, using a spectrophotometer (SolidSpec-3700, manufactured by Shimadzu Corporation), a measurement wavelength was set to 500 nm. In addition, in the measurement, the measurement liquid was accommodated in a quartz cell. In addition, an absorbance of a dispersion medium that does not contain impurities other than the dispersing agent was measured as a reference, and the concentration of the CNTs 17 was obtained by using a difference between the absorbance of the measurement liquid in which the CNTs 17 are dispersed, and the reference. Note that, in the above description, the carbon fiber bundle 12 to which the sizing agent adhered was used, but the weight ratio R may be obtained by using a measurement sample acquired from the carbon fiber bundle 12 from which the sizing agent is removed.

Measurement results and the weight ratio R relating to the measurement samples A1 to A10, an average of the weight ratio R, and a standard deviation s are shown in Table 1. In Table 1, the weight of the measurement liquid before putting the measurement sample is shown in a column of "liquid weight (before putting)", and the sum of the CF weight Wa and the CNT weight Wb is shown in a column of "CNT+CF weight". The weight ratio R of the measurement samples A1 to A10 was within a range of 0.001 to 0.005. In addition, the average of the weight ratio R relating to the measurement samples A1 to A10 was approximately 0.0012, and the standard deviation s was 0.0002 or less. In addition, a ratio of the standard deviation s to the average of the weight ratio R was 12% or less. From the results, it was confirmed that the CNTs 17 uniformly adhered to the carbon fiber 11 of the carbon fiber bundle 12 in the fiber axis direction.

Examples 2 and 3

(Evaluation of Vibration Damping Property)

Figure 17:
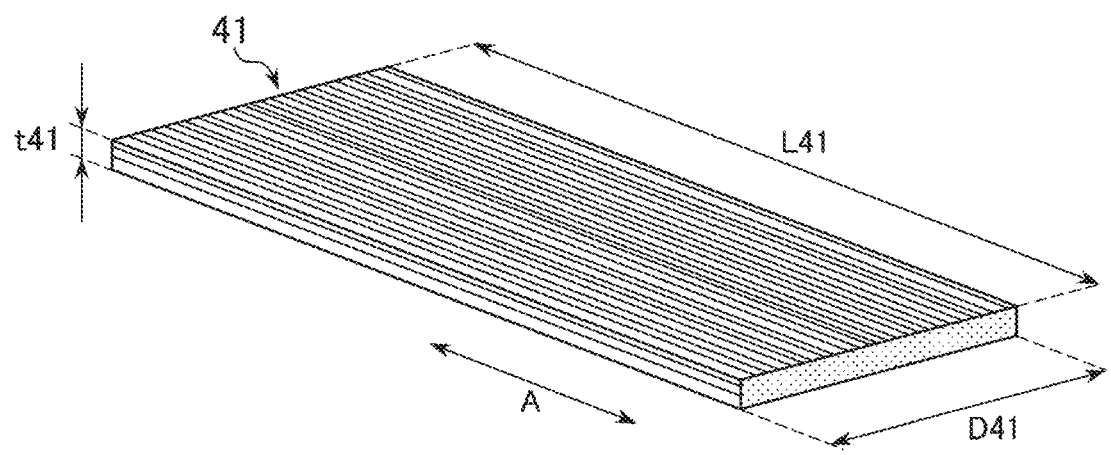
FIG. 17 is a perspective view illustrating a test piece used for evaluation of vibration damping property.

As Example 2, as illustrated in FIG. 17, a plate-shaped test piece 41 was manufactured as the carbon-fiber-reinforced molded article, and the vibration damping property (damping properties) was evaluated. In the test piece 41 of Example 2, a width D41 was set to 15 mm, a length L41 was set to 200 mm, and the thickness t41 was set to 1.8 mm. In production of the test piece 41, 16 sheets of the prepregs 31 cut into a rectangle of 200 mm×15 mm were laminated, and the resultant laminated body was heated at 145° C. for one hour while being pressed to cure the matrix resin 32. The prepregs 31 were cut so that a longitudinal direction matches the fiber axis direction of the carbon fiber 11. Accordingly, in the test piece 41, fiber axis directions (direction indicated by an arrow A in the drawing) of all carbon fibers 11 match the longitudinal direction.

Figure 18:
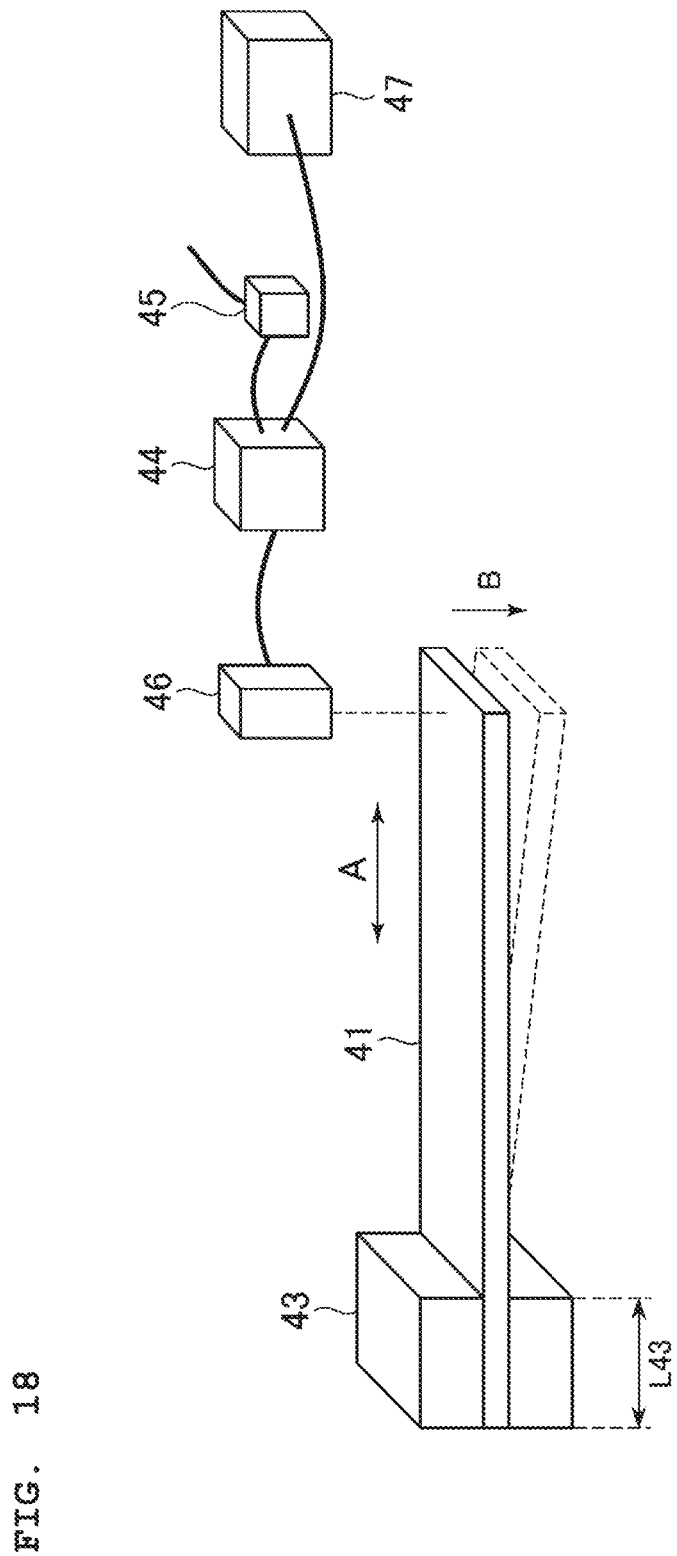
FIG. 18 is an explanatory diagram illustrating a device used in measurement of the vibration damping property of the test piece.

As illustrated in FIG. 18, one end of the test piece 41 in the longitudinal direction was clamped by a support stand 43, and the test piece 41 was fixed in a horizontal posture. At this time, a clamping length L43 was set to 50 mm. The other end of the test piece 41 was pressed by approximately 5 mm in a vertical direction (direction indicated by an arrow B), and was released to vertically vibrate the other end of the test piece 41. The amount of displacement of the other end of the test piece 41 was measured by a laser displacement meter 46 that is connected to a power source 45 through a controller 44. As the laser displacement meter 46, LK-G5000V/LK-H0850 (manufactured by Keyence Corporation) was used. The amount of displacement measured by the laser displacement meter 46 was collected by a computer 47.

Figure 19:
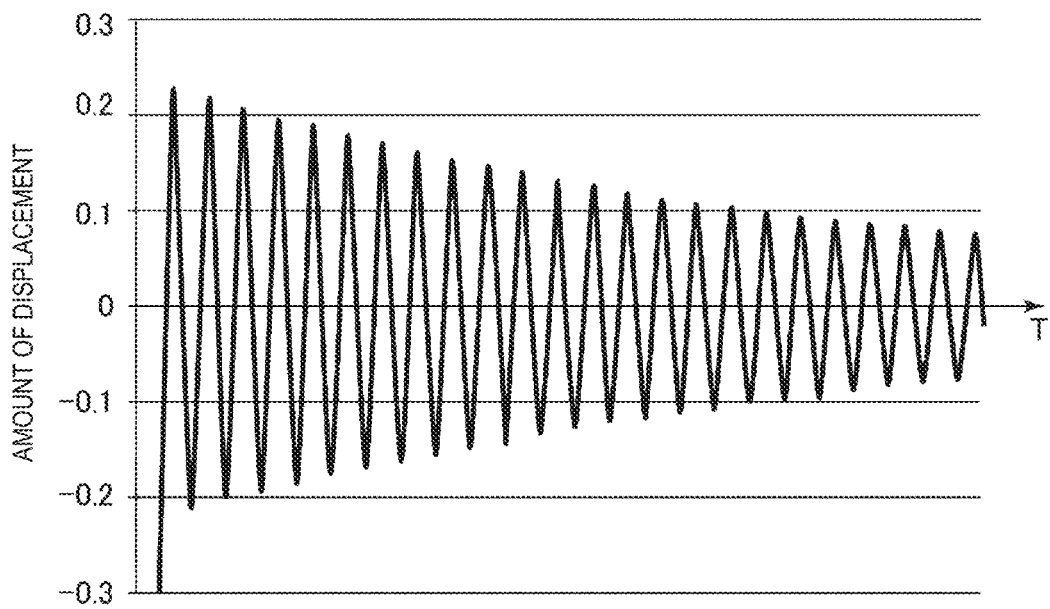
FIG. 19 is a graph illustrating an example of a temporal change in the amount of displacement of the test piece.

FIG. 19 illustrates an example of a variation of the mount of displacement which is measured. In a graph in FIG. 19, the horizontal axis represents time and the vertical axis represents the amount of displacement (amplitude) of the other end of the test piece 41. The graph shows that the vibration amplitude of the test piece 41 decreases with the passage of time. A vibration decrement at 10 points was averaged from the maximum amplitude (positive peak) of the test piece 41 by using the amount of displacement which was measured to obtain a logarithmic decrement δ of the vibration.

In Example 2, five sheets of the test pieces 41 were manufactured as samples B1 to B5, and with respect to the samples, the amount of displacement was measured as described above to obtain the logarithmic decrement δ. In addition, in Example 3, five sheets of the test pieces 41 were

TABLE 1

| Measurement samples | Transmittance [%] | Absorbance | CNT concentration [$10^{-4}$ wt %] | Liquid weight (before putting) [g] | CNT weight (Wb) [g] | CNT + CF weight (Wa + Wb) [g] | Weight ratio (Wb/(Wa + Wb)) |
|---|---|---|---|---|---|---|---|
| A1 | 90.295 | 0.044336298 | 0.638422030 | 4.2135 | 0.000002690 | 0.0019 | 0.00141578485 |
| A2 | 91.167 | 0.040162336 | 0.520179494 | 4.2495 | 0.000002211 | 0.0018 | 0.00122805709 |
| A3 | 91.726 | 0.037507545 | 0.444972942 | 4.0671 | 0.000001810 | 0.0018 | 0.00100541636 |
| A4 | 89.890 | 0.046288620 | 0.693728600 | 4.0555 | 0.000002813 | 0.0023 | 0.00122322449 |
| A5 | 91.470 | 0.038721321 | 0.479357533 | 4.3895 | 0.000002104 | 0.0021 | 0.00100197138 |
| A6 | 88.817 | 0.051503900 | 0.841470261 | 4.2045 | 0.000003538 | 0.0029 | 0.00121998680 |
| A7 | 89.675 | 0.047328615 | 0.723190217 | 4.4050 | 0.000003186 | 0.0025 | 0.00127426116 |
| A8 | 88.962 | 0.050795462 | 0.821401191 | 4.6700 | 0.000003836 | 0.0027 | 0.00142071984 |
| A9 | 89.951 | 0.045994004 | 0.685382554 | 4.2826 | 0.000002935 | 0.0026 | 0.00112893051 |
| A10 | 90.489 | 0.043404211 | 0.612017314 | 4.0714 | 0.000002492 | 0.0021 | 0.00118655585 |
| | | | | | | Average | 0.00121049083 |
| | | | | | | Standard deviation | 0.00013554715 | manufactured as samples B6 to B10, and with respect to the samples, the amount of displacement was measured as described above to obtain the logarithmic decrement δ. As described above, in the test pieces 41 of Example 3, the concentration of the dispersion 28 when producing the composite material 10 was set to be lower in comparison to Example 2. An average of the logarithmic decrements S of the samples of Examples 2 and 3, and an average of the logarithmic decrements δ for every example are shown in Table 2.

TABLE 2

|  | Sample No. | Logarithmic decrement | Average |
|---|---|---|---|
| Example 2 | B1 | 0.0379 | 0.0381 |
|  | B2 | 0.0382 |  |
|  | B3 | 0.0383 |  |
|  | B4 | 0.0381 |  |
|  | B5 | 0.0382 |  |
| Example 3 | B6 | 0.0294 | 0.0292 |
|  | B7 | 0.0294 |  |
|  | B8 | 0.0296 |  |
|  | B9 | 0.0284 |  |
|  | B10 | 0.0291 |  |
| Comparative Example 1 | B11 | 0.0221 | 0.0242 |
|  | B12 | 0.0231 |  |
|  | B13 | 0.0255 |  |
|  | B14 | 0.0247 |  |
|  | B15 | 0.0258 |  |
| Comparative Example 2 | B16 | 0.0296 | 0.0290 |
|  | B17 | 0.0300 |  |
|  | B18 | 0.0268 |  |
|  | B19 | 0.0295 |  |
|  | B20 | 0.0289 |  |

As Comparative Example 1, test pieces (samples B11 to B15) which are carbon-fiber-reinforced molded articles using the first comparison prepreg were manufactured. In addition, as Comparative Example 2, test pieces (samples B16 to B20) which are carbon-fiber-reinforced molded articles using the second comparison prepreg were manufactured. The thickness of the structure formed on the carbon fibers of Comparative Example 2 was approximately 20 nm, and the weight ratio R in a range of 1 m was in a range of 0.001 to 0.0015. With respect to the samples B11 to B20, the amount of displacement was measured in a similar manner as in Examples 2 and 3 to obtain logarithmic decrements δ. The logarithmic decrements δ of the samples B11 to B20 and an average of the logarithmic decrements δ for every comparative example are shown in Table 2.

Figure 20:
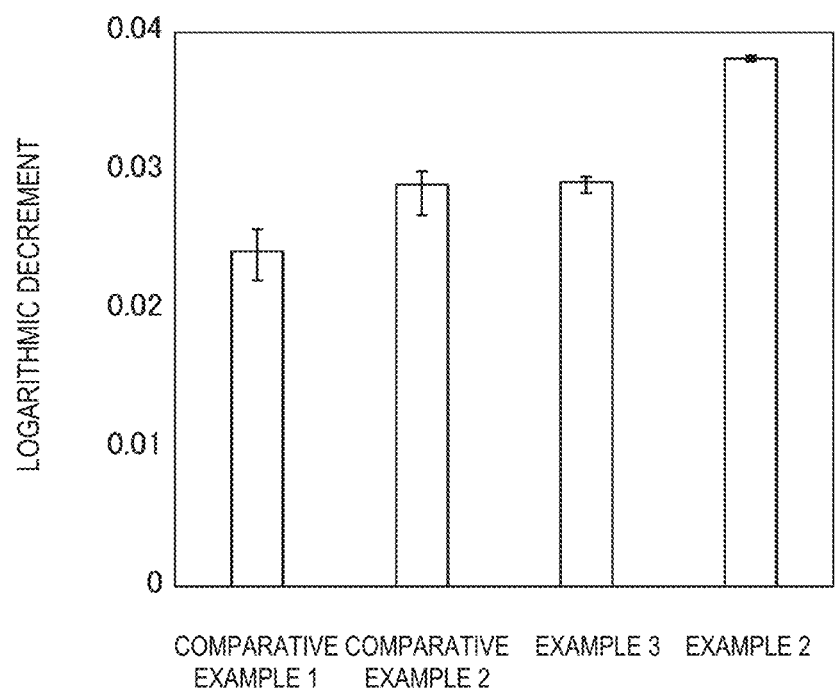
FIG. 20 is a graph illustrating a difference in logarithmic decrement.

FIG. 20 illustrates a graph of the average of the logarithmic decrements δ of Examples 2 and 3, and Comparative Examples 1 and 2. As can be seen from Table 2 and the graph in FIG. 20, in Examples 2 and 3, and Comparative Example 2, the logarithmic decrement δ is more and the vibration damping property (damping properties) is higher in comparison to Comparative Example 1 in which CNTs do not adhere to the carbon fibers. In Example 2 and Comparative Example 2, it can be seen that the concentration of the CNT in the dispersion is the same in each case, the logarithmic decrement δ of Example 2 using the CNTs having the bent shape is more and the vibration damping property is higher in comparison to Comparative Example 2 using CNTs with high linearity. In addition, in Example 3, the concentration of the CNT in the dispersion is lower in comparison to Example 2, but the vibration damping property that is equal or more is obtained in comparison to Comparative Example 2. From the results, it could be confirmed that the number of CNTs 17 which have a bent shape and adhere to the carbon fibers 11 is more and the vibration damping property as the property derived from the CNTs becomes higher in comparison to a case where CNTs with high linearity are caused to adhere to the carbon fibers. In addition, in Examples 2 and 3, it can be seen that the variation is small. As a result, it can be seen that design of the carbon-fiber-reinforced molded article becomes easy.

Example 4

(Variation Property of Bending Elastic Modulus)

Figure 21:
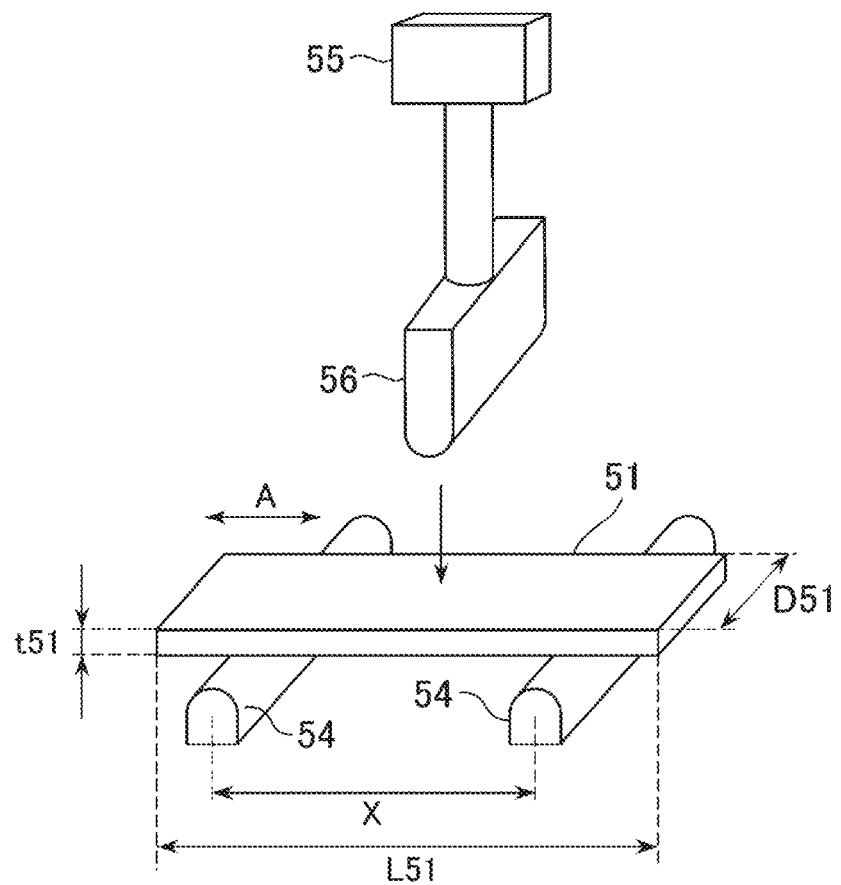
FIG. 21 is a perspective view illustrating a device used in measurement of a bending elastic modulus of the test piece.

As illustrated in FIG. 21, in Example 4, a plate-shaped test piece 51 was manufactured as the carbon-fiber-reinforced molded article, and the variation property of the bending elastic modulus was evaluated. In the test piece 51, a length L51 was set to 100 mm, a width D51 was set to 15 mm, and a thickness t51 was set to 1.8 mm. In production of the test piece 51, 16 sheets of the prepregs 31 cut into a rectangle of 100 mm×15 mm were laminated, and the resultant laminated body was heated at 145° C. for one hour while being pressed to cure the matrix resin 32. As in the test piece 41 in Example 2, in the test piece 51, fiber axis directions (direction indicated by an arrow A in the drawing) of all carbon fibers 11 match the longitudinal direction.

The variation property of the bending elastic modulus of the test piece 51 was evaluated from a difference in elastic modulus of the test piece 51 which is obtained from respective measurement results of two types of three-point bending tests in which a movement speed of an indenter is low or high (hereinafter, referred to as "low-speed three-point bending test" and "high-speed three-point bending test").

The low-speed three-point bending test was performed in conformity to JIS K 7074:1988 "Testing methods for flexural properties of carbon-fiber-reinforced plastics" by using an autograph AGS-X (manufactured by Shimadzu Corporation). That is, as illustrated in FIG. 21, the test piece 51 was supported by two supporting points 54 disposed to be spaced apart from each other along a longitudinal direction of the test piece 51, an indenter 56 was made to vertically descend to the center of the test piece 51 while measuring a load with a load cell 55, and a variation of the load at that time was measured. A distance X between the pair of supporting points 54 was set to 80 mm, and a test speed (cross head speed) was set to $8.30 \times 10^{-2}$ mm/second (=5 mm/minute). The bending elastic modulus (hereinafter, low-speed bending elastic modulus) of the test piece 51 was obtained from a measurement result of the low-speed three-point bending test.

The high-speed three-point bending test was performed under the same conditions as in the low-speed three-point bending test except that the test speed was set to 1,000 mm/second, and in the high-speed three-point bending test, the bending elastic modulus (hereinafter, high-speed bending elastic modulus) of the test piece 51 was obtained from a measurement result of the high-speed three-point bending test. The high-speed three-point bending test was performed in conformity to JIS K 7074:1988 by using a high-speed impact tester EHF-22H-20L (manufactured by Shimadzu Corporation).

In the low-speed three-point bending test and the high-speed three-point bending test, since the test piece 51 was fractured, and thus a different test piece 51 was used in each test for measurement. In the low-speed three-point bending test, a variation in the measurement result was small, and thus an average of the low-speed bending elastic modulus obtained for a plurality of sheets of the test pieces 51 manufactured from the prepreg 31 of the same lot was used in the evaluation. In the high-speed three-point bending test, four sheets of test pieces 51 were manufactured as samples C1 to C4, and the high-speed bending elastic modulus was obtained with respect to each of the test pieces 51. The low-speed bending elastic modulus (average) and the high-speed bending elastic modulus of the respective samples C1 to C4 are shown in Table 3. In Table 3, the low-speed bending elastic modulus is shown in a column of "Low speed" and the high-speed bending elastic modulus is shown in a column of "High speed". In addition, in a column of "Variation rate" of "Bending elastic modulus", a variation rate (increase rate) indicating an increase ratio of the high-speed bending elastic modulus with respect to the low-speed bending elastic modulus is shown. Note that, the thickness and the width shown in Table 3 are average values of the thicknesses and widths obtained by actually measuring the samples C1 to C4.

TABLE 3

|  | Sample No. | Thickness [mm] (average) | Width [mm] (average) | Bending elastic modulus | | |
|---|---|---|---|---|---|---|
|  |  |  |  | Low speed [GPa] | High speed [GPa] | Variation rate |
| Example 4 | C1 | 1.81 | 15.34 | 117.9 | 118.0 | 0.1 |
|  | C2 | 1.81 | 15.33 |  | 121.2 | 2.8 |
|  | C3 | 1.80 | 15.33 |  | 119.8 | 1.6 |
|  | C4 | 1.81 | 15.26 |  | 120.4 | 2.1 |
| Comparative Example 3 | C5 | 1.81 | 15.36 | 110.2 | 117.0 | 6.2 |
|  | C6 | 1.81 | 15.29 |  | 117.6 | 6.7 |
|  | C7 | 1.81 | 15.39 |  | 121.9 | 10.7 |
|  | C8 | 1.81 | 15.38 |  | 118.4 | 7.5 |
|  | C9 | 1.81 | 15.40 |  | 120.5 | 9.4 |
|  | C10 | 1.80 | 15.38 |  | 121.5 | 10.2 |
|  | C11 | 1.81 | 15.36 |  | 121.8 | 10.6 |
|  | C12 | 1.80 | 15.32 |  | 121.7 | 10.4 |
|  | C13 | 1.80 | 15.34 |  | 118.7 | 7.7 |
|  | C14 | 1.80 | 15.26 |  | 119.1 | 8.1 |
| Comparative Example 4 | C15 | 1.79 | 15.38 | 115.0 | 117.2 | 1.9 |
|  | C16 | 1.79 | 15.35 |  | 119.5 | 3.9 |
|  | C17 | 1.79 | 15.36 |  | 119.9 | 4.3 |
|  | C18 | 1.79 | 15.32 |  | 118.4 | 3.0 |
|  | C19 | 1.79 | 15.34 |  | 119.1 | 3.5 |
|  | C20 | 1.80 | 15.36 |  | 117.2 | 2.0 |
|  | C21 | 1.80 | 15.35 |  | 118.9 | 3.4 |
|  | C22 | 1.79 | 15.45 |  | 115.6 | 0.5 |
|  | C23 | 1.80 | 15.36 |  | 117.5 | 2.2 |
|  | C24 | 1.79 | 15.41 |  | 118.9 | 3.4 |

In addition, an average of each of the low-speed bending elastic modulus and the high-speed bending elastic modulus of the test piece 51 is shown in Table 4. In Table 4, a relative value of the high-speed bending elastic modulus when the low-speed bending elastic modulus is set as a reference (100), and a standard deviation of the variation rate in the bending elastic modulus of the samples C1 to C4 are collectively shown.

TABLE 4

|  | Average bending elastic modulus [GPa] (absolute value) | | Average bending elastic modulus (relative value) | | Standard deviation of variation rate |
|---|---|---|---|---|---|
|  | Low speed | High speed | Low speed | High speed |  |
| Example 4 | 117.9 | 119.9 | 100 | 101.7 | 0.99 |
| Comparative Example 3 | 110.2 | 119.8 | 100 | 108.7 | 1.62 |
| Comparative Example 4 | 115 | 118.2 | 100 | 102.8 | 1.08 |

A test piece that is a carbon-fiber-reinforced molded article using the first comparison prepreg was manufactured as Comparative Example 3, and a test piece that is a carbon-fiber-reinforced molded article using the second comparison prepreg was manufactured as Comparative Example 4. As in Example 4, with regard to Comparative Examples 3 and 4, an average of the low-speed bending elastic modulus measured by using a plurality of sheets of test pieces manufactured from the prepreg 31 of the same lot was used for evaluation. In addition, in the high-speed three-point bending test, ten test pieces were manufactured as samples with respect to each of Comparative Examples 3 and 4, and the high-speed bending elastic modulus was obtained with respect to each of samples C5 to C14 of Comparative Example 3 and samples C15 to C24 of Comparative Examples 4. These results are shown in Table 3. In addition, as in Example 4, with regard to Comparative Examples 3 and 4, an average of each of the low-speed bending elastic modulus and the high-speed bending elastic modulus, a relative value of the high-speed bending elastic modulus when the low-speed bending elastic modulus is set as a reference (100), and a standard deviation of the variation rate of the bending elastic modulus of the samples are collectively shown.

From Table 3 and Table 4, it can be seen that the variation rate of the bending elastic modulus of Comparative Example 4 and Example 4 is smaller in comparison to Comparative Example 3. The reason for this is as follows. Since the CNTs adhere to the carbon fibers, the CNT has an operation of suppressing an increase in the bending elastic modulus of the carbon-fiber-reinforced molded article with respect to an increase in a bending speed. In addition, it can be seen that the variation of the bending elastic modulus of Example 4 is smaller in comparison to Comparative Example 4. The reason for this is assumed as follows. In Example 4, since the number of CNTs 17 adhered to the surfaces of the carbon fibers 11 is larger in comparison to Comparative Example 4, an effect of suppressing an increase of the elastic modulus which accompanies an increase in the bending speed becomes higher. In addition, it can be seen that in Example 4, the standard deviation relating to the variation rate of the bending elastic modulus is smaller, and a variation of a variation property of the bending elastic modulus is smaller in comparison to Comparative Example 3 and Comparative Example 4.

Example 5

(Evaluation of Fatigue Property)

Figure 22:
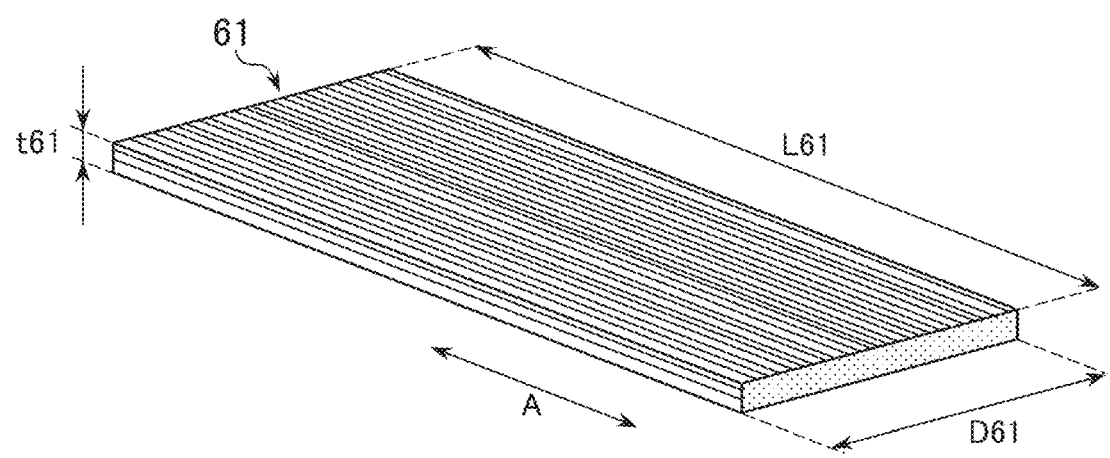
FIG. 22 is a perspective view illustrating a test piece used for evaluation of a bending fatigue property.
Figure 23:
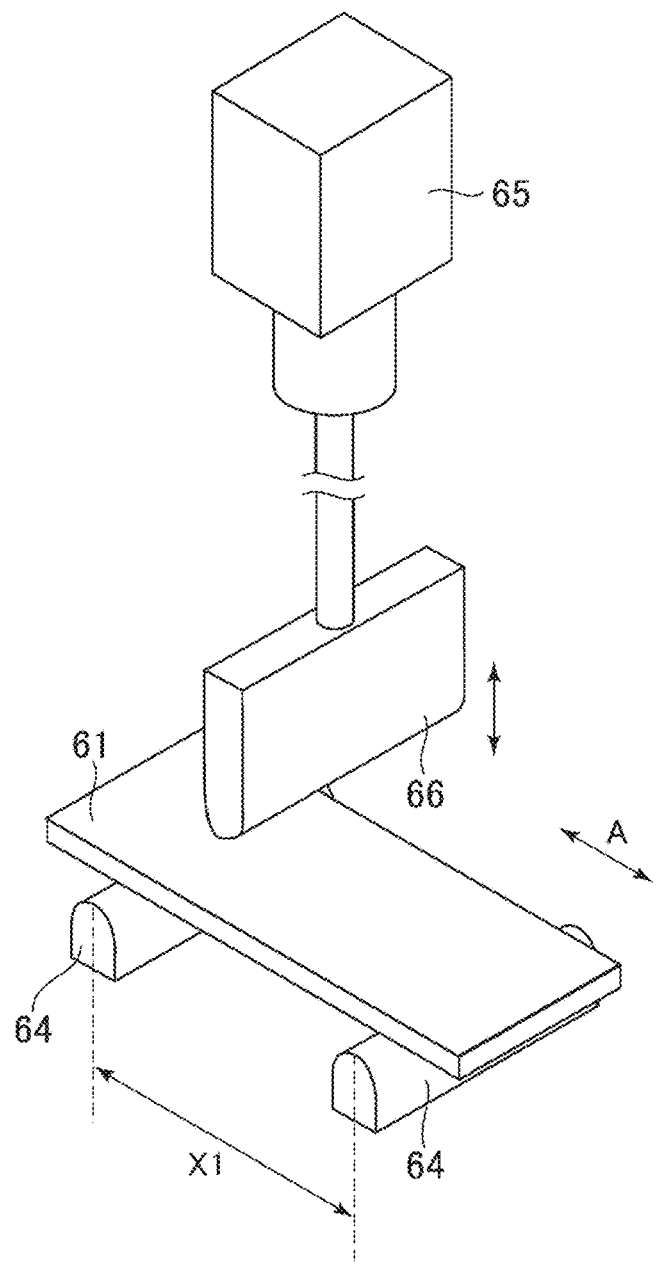
FIG. 23 is a perspective view illustrating a device used in measurement of the bending fatigue property.

In Example 5, as illustrated in FIG. 22, a plate-shaped test piece 61 was manufactured as the carbon-fiber-reinforced molded article, and three-point bending fatigue test was performed to evaluate bending fatigue property. In the test piece 61 of Example 5, a width D61 was set to 15 mm, a length L61 was set to 20 mm or longer, and a thickness t61 was set to 1.8 mm. In production of the test piece 61, 16 sheets of prepregs 31 cut into a rectangle (L61×D61) were laminated, and the resultant laminated body was heated at 145° C. for one hour while being pressed to cure the matrix resin 32. The prepregs 31 were cut so that a longitudinal direction matches the fiber axis direction of the carbon fiber 11. Accordingly, in the test piece 61, fiber axis directions (direction indicated by an arrow A in the drawing) of all carbon fibers 11 match the longitudinal direction.

The three-point bending fatigue test was performed by using a servo pulse EHF-LB-5 kN (manufactured by Shimadzu Corporation) as a test device. As illustrated in FIG.

23, the test piece 61 was set to the test device so that the test piece 61 was supported from a lower side by a pair of supporting points 64 disposed to be spaced apart from each other along a longitudinal direction of the test piece 61, and the test piece 61 was pressed downward by an indenter 66 disposed on an upward side of the center (a position equally spaced from the supporting points 64) of the pair of supporting points 64 while measuring a load with a load cell 65. An inter-supporting-point distance X1 between the pair of supporting points 64 was set to 20 mm.

Figure 24:
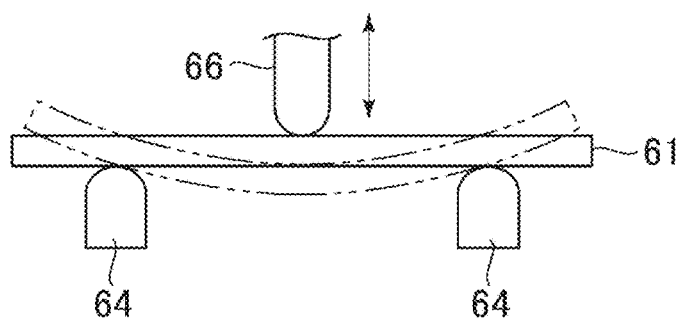
FIG. 24 is an explanatory diagram illustrating a bending state in test of the test piece.

As illustrated in FIG. 24, the indenter 66 was made to vertically descend from a position where the indenter 66 was brought into contact with the test piece 61 to deform the test piece 61 to a downward side, and at a point of time at which the load reached a predetermined value (stress amplitude), the indenter 66 was made to ascend up to a position where the load reached "0" to release the pressing, and then the indenter 66 was made to vertically descend. This operation was repeated. A vertical movement frequency of the indenter 66 was set to 10 Hz. In this manner, the three-point bending fatigue test by pulsating was performed, and the number of times of repetition until the load reached "0" when the indenter 66 was made to vertically descend was counted. In Example 5, four sheets of test pieces 61 were manufactured, and the number of times of repetition was counted while changing the stress amplitude. Results of Example 5 are illustrated in FIG. 25.

The number of times of repetition when the stress amplitude was 1,333 MPa was 67,763. In addition, when the stress amplitude was set to 1,189 MPa, 1,243 MPa, and 1,172 MPa, the number of times of repetition was 372,573, 92,107, and 1,000,000, respectively. That is, in the test piece 61 that is the carbon-fiber-reinforced molded article including the composite material 10, the number of times of repetition when the stress amplitude was within a range of 1,100 MPa to 1,300 MPa was within a range of 92,000 to 1,000,000.

As comparative Example 5, a carbon-fiber-reinforced molded article was manufactured by using the first comparison prepreg, and with respect to three sheets of test pieces as the carbon-fiber-reinforced molded article using the first comparison prepreg, the three-point bending fatigue test was performed to evaluate the bending fatigue property. The test piece of Comparative Example 5 was manufactured in the same procedure and in the same size as in the test piece 61 of Example 5. 16 sheets of comparison prepregs were laminated and the resultant laminated body was heated while being pressed to cure the matrix resin. Conditions of the three-point bending fatigue test of Comparative Example 5 were set to be the same as in Examples 5. Results of the three-point bending fatigue test of the test piece of the Comparative Example 5 are illustrated in FIG. 25.

Figure 25:
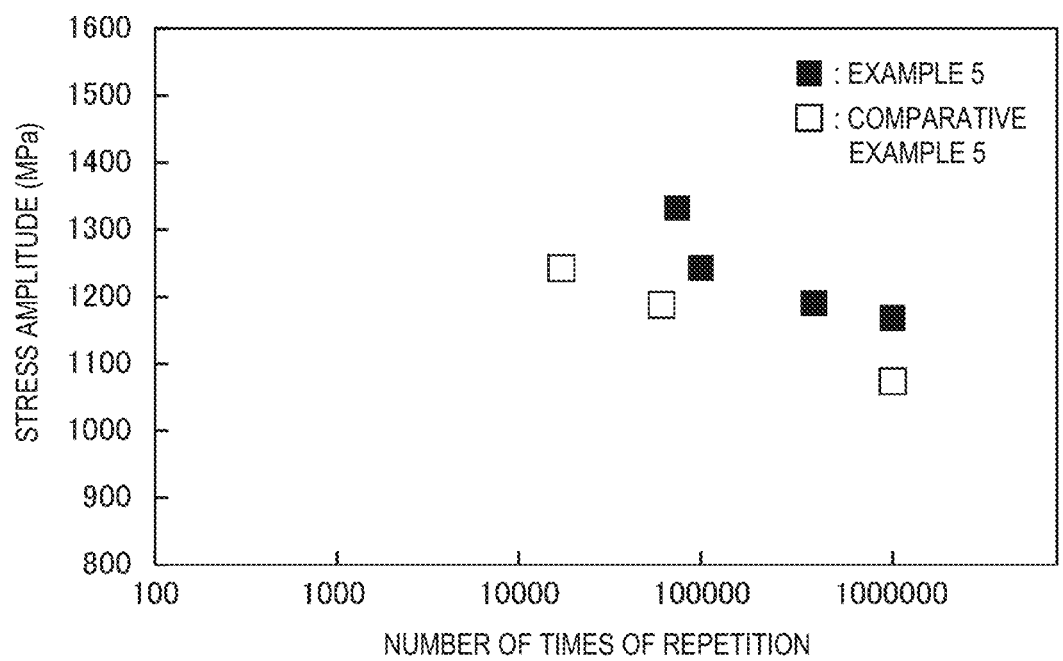
FIG. 25 is a graph illustrating a relationship between the number of times of repetition and a stress amplitude.

As can be seen from a graph in FIG. 25, in a case where the stress amplitude is the same, in the test piece 61 of Example 5, the number of times of repetition is more and a fatigue lifetime is longer in comparison to the test piece of Comparative example 5 in which the CNTs do not adhere to the carbon fibers.

Examples 6 and 7

A carbon-fiber-reinforced molded article (test piece) used in Example 6 was manufactured from the composite material 10A through the prepreg 31, and a 90° bending test was performed with respect to the test piece.

In production of the composite material 10A, as described above, the second sizing treatment was performed with respect to the carbon fiber bundle 12 that was dried after being taken out from the dispersion 28 to form the fixing resin parts 38. In the second sizing treatment, a material obtained by diluting Epocross (manufactured by NIPPON SHOKUBAI CO., LTD.) in pure water was used as the sizing liquid. The sizing liquid was diluted with pure water so that the amount of adhesion of the fixing resin parts 38 after drying becomes approximately 1.5% by mass. A reactive resin in a liquid droplet shape having a particle size of approximately 0.1 to 0.4 μm was contained in the sizing liquid. In addition, in a curing treatment, the carbon fiber bundle 12 was heated on a hot plate maintained at approximately 80° C. to perform the curing treatment.

Figure 26:
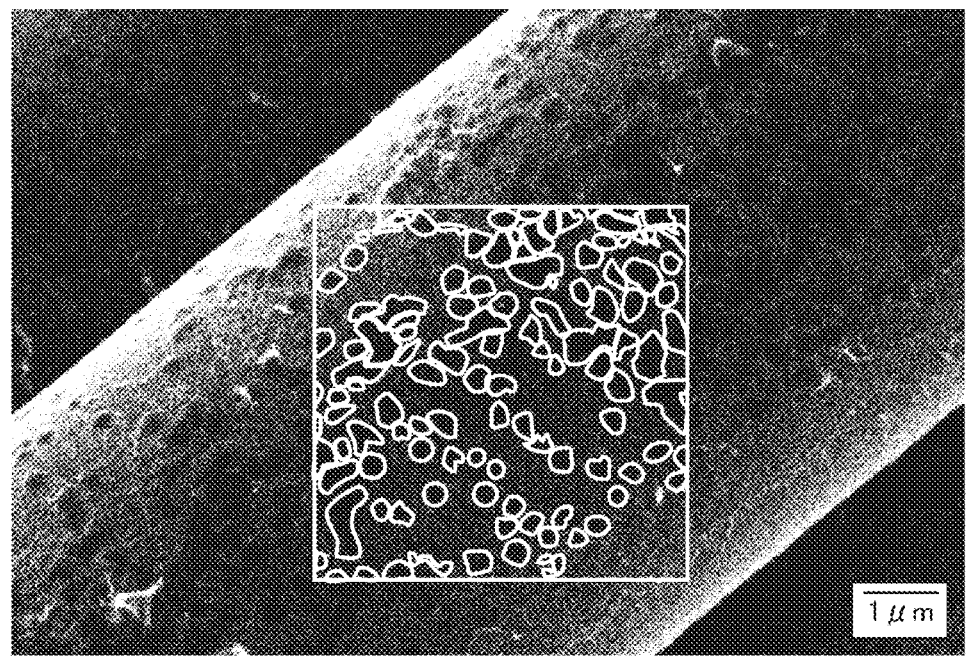
FIG. 26 is an explanatory diagram illustrating a state obtained by measuring the fixing resin part on the surface of the structure.

A SEM photograph of the surface of the structure 14 of the composite material 10A in which the fixing resin parts 38 are formed as described above is illustrated in FIG. 26. The SEM photograph was analyzed by image analysis software (Winroof2015 (manufactured by MITANI CORPORATION)) to obtain the area ratio S and the number ratio N as described above. That is, as illustrated in FIG. 26, an observation frame (white rectangular frame) of 5 μm square was set on a surface of the structure 14, the number (number ratio N) of the fixing resin parts 38 existing in the observation frame and the area ratio S of the fixing resin parts 38 were obtained. The number ratio N was 117, and the area ratio S was 32.1%. At this time, an area of each of the fixing resin parts 38 existing in the observation frame was a range of 0.03 to 1.12 μm².

The composite material 10A manufactured as described above was opened, and the composite material 10A was impregnated with an epoxy resin as the matrix resin 32 in the opened state, thereby producing the prepreg 31. A volume content of the matrix resin 32 in the prepreg 31 was 30%. In addition, the weight of the composite material 10 in the prepreg 31 per unit area was set to 180 g/m². In the prepreg 31, 10 to 16 carbon fibers 11 existed in the thickness direction.

Figure 27:
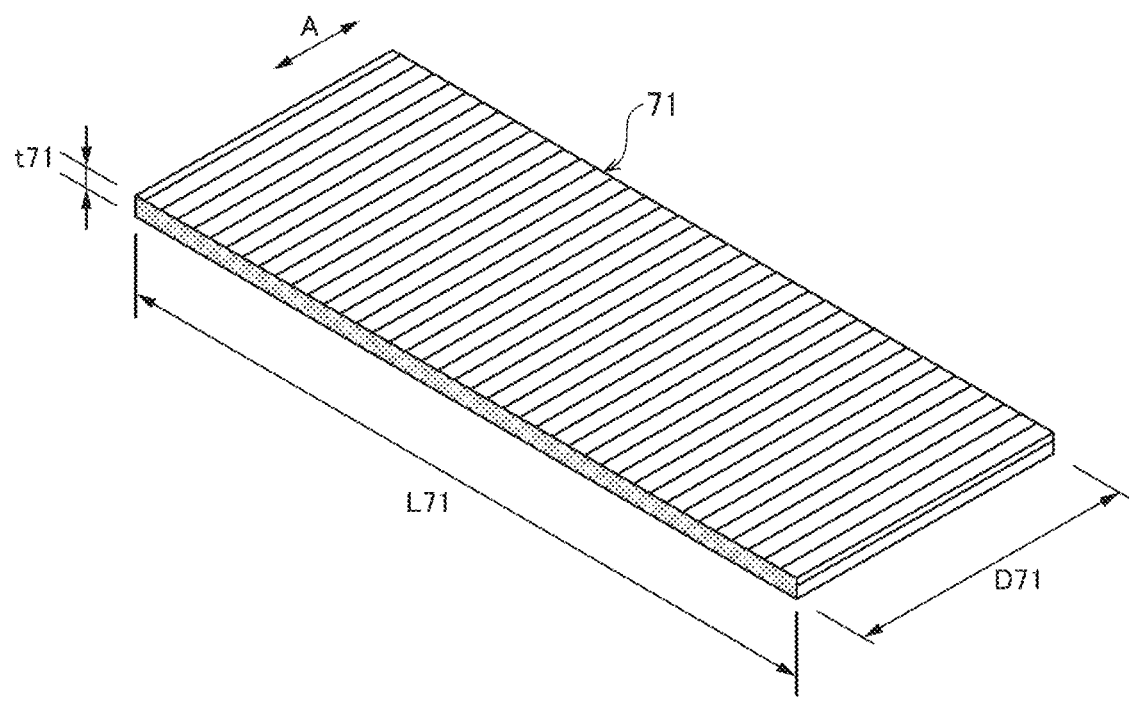
FIG. 27 is a perspective view illustrating a test piece used in a 90° bending test.

The prepreg 31 was cut to have a width 15 mm and a length of 100 mm, and then 16 sheets of the prepregs 31 were laminated to obtain a laminated body. The laminated body was heated while being pressed, thereby producing six sheets of test pieces (carbon-fiber-reinforced molded articles) 71 of Example 6 as illustrated in FIG. 27. In the test pieces 71, a width D71 was 15 mm, a length L71 was 100 mm, and a thickness t71 was 1.8 mm. In the pressing and heating, an autoclave (DANDELION, manufactured by HANYUDA. CO. JP.) was used, and each of the test pieces 71 was heated at 145° C. for one hour while being pressed to cure the matrix resin 32. In the test piece 71, fiber axis directions (direction indicated by an arrow A in the drawing) of all carbon fibers 11 match a width direction.

Figure 28:
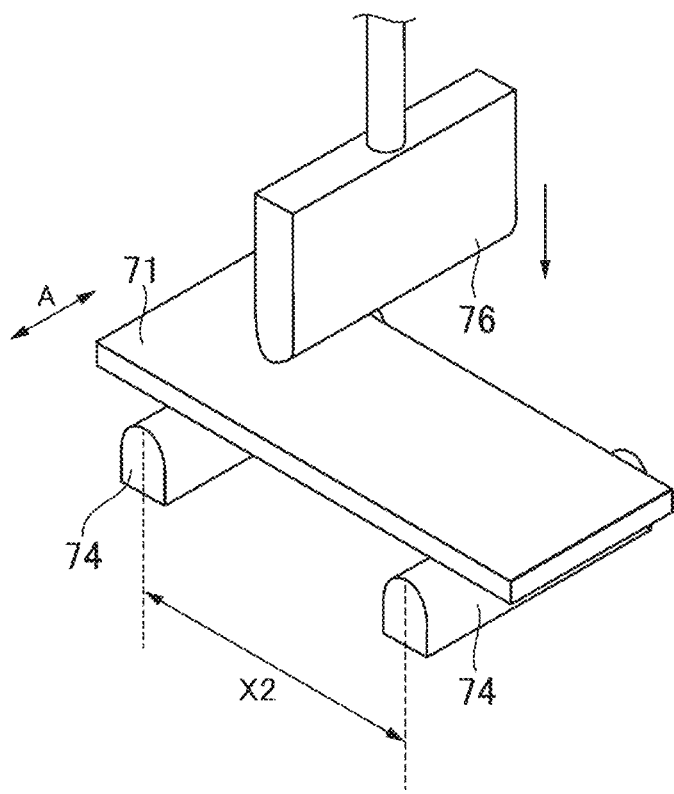
FIG. 28 is a perspective view illustrating an outline of a 90° bending test device.

Bending strength of the test piece 71 was measured by a 90° bending test. In the 90° bending test, an autograph AGS-X-5 kN (manufactured by Shimadzu Corporation) was used as a test device, and the test was performed in conformity to JIS K 7074. That is, as illustrated in FIG. 28, the test piece 71 was set to the test device so that the test piece 71 was supported from a lower side by a pair of supporting points 74 disposed to be spaced apart from each other by 20 mm (=X2) along a longitudinal direction of the test piece 71, and the test piece 71 was pressed downward by an indenter 76 disposed on an upward side of the center of the pair of supporting points 74 while measuring a load with a load cell (not illustrated), thereby bending the test piece 71 by 90°.

In addition, in Example 7, the structure 14 of the CNTs 17 was formed on the carbon fibers 11, but the prepreg 31 was manufactured from a carbon fiber bundle in which the entire surface of the structure 14 was covered with a cured resin instead of the fixing resin parts 38, and six sheets of test pieces (carbon-fiber-reinforced molded articles) were manufactured from the prepreg 31. That is, the test piece of Example 7 is a carbon-fiber-reinforced molded article manufactured by using the carbon fibers 11 in which the first sizing agent was applied to the structure 14 by the first sizing treatment. Other production conditions of the test piece of Example 7 were set to be the same as in the test piece 71 of Example 6. As in the test piece 71, the bending strength was also measured with respect to the six sheets of the test pieces of Example 7.

The bending strength measured with respect to each of the six sheets of test pieces of Examples 6 and 7, and an average of the bending strength are shown in Table 5.

TABLE 5

|  | Specifications | Bending strength [Mpa] | Average value of Bending strength [Mpa] |
|---|---|---|---|
| Example 6 | With structure With fixing resin parts | 114.6 110.2 112.1 114.4 120.8 105.2 | 112.9 |
| Example 7 | With structure Structure surface was covered with resin | 91.0 89.5 94.4 91.5 87.9 92.5 | 91.1 |
| Comparative Example 6 | Without structure (CNT) | 85.4 84.2 83.4 81.3 79.5 77.8 | 81.9 |

In addition, as Comparative Example 6, a test piece (carbon-fiber-reinforced molded article) was manufactured from the first comparison prepreg. Other production conditions of the test piece of Comparative Example 6 were set to be the same as in the test piece 71 of Example 6. With respect to six sheets of the test pieces of Comparative Example 6, bending strength was measured as in the test piece 71 of Example 6. Measurement results of Comparative Example 6 are shown in Table 5.

As can be seen from Table 5, when the structure 14 is provided on the surfaces of the carbon fibers 11 as in Examples 6 and 7, the bending strength of the carbon-fiber-reinforced molded article is improved, and when the structure 14 is fixed by a plurality of scattering fixing resin parts 38 as in Example 6, the bending strength of the carbon-fiber-reinforced molded article is further improved.

Example 8

In order to investigate the tendency of the number ratio N and the area ratio S of the fixing resin parts 38, 11 types of samples in which the amount of the fixing resin parts 38 adhered to the carbon fibers 11 is different in each case were manufactured. The carbon fiber bundle, treatment conditions for the carbon fiber bundle, and the like were similar as in the case of Example 6 except for a dilution rate of the sizing liquid. With respect to each obtained sample, an observation frame of 5 μm square was set, and the number ratio N and the area ratio S were investigated.

Figure 29:
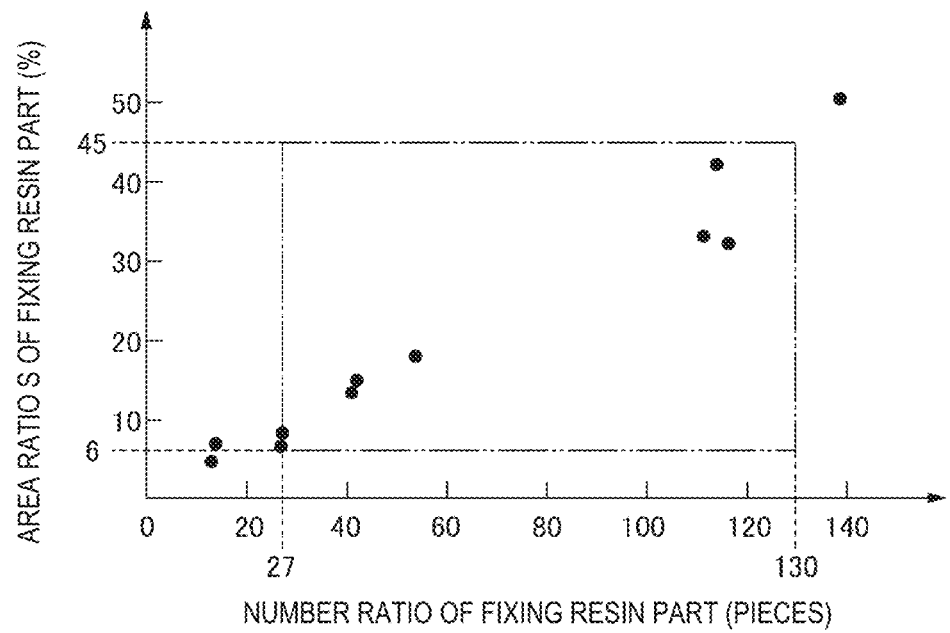
FIG. 29 is a graph illustrating a relationship between a number ratio and an area ratio of the fixing resin part.

FIG. 29 illustrates a relationship between the number ratio N and the area ratio S with respect to each sample. It can be seen that the area ratio S becomes 6% to 45% in a case where the number ratio N is within a range of 27 to 130, and the area ratio S is proportional to the number ratio N.

REFERENCE SIGNS LIST

10 Composite material
11 Carbon fiber
12 Carbon fiber bundle
14 Structure
17 Carbon nanotube
34 Carbon-fiber-reinforced molded article
38 Fixing resin part

The invention claimed is:

1. A composite material comprising:
   carbon fibers; and
   a structure which includes by a plurality of carbon nanotubes and has a network structure in which the carbon nanotubes are in direct contact with each other, and in which the carbon nanotubes adhered to surfaces of the carbon fibers directly adhere to the surfaces of the carbon fibers,
   wherein each of the carbon nanotubes has a length within a range of 0.1 to 10 μm, and the carbon nanotubes have a bent shape having a bent portion,
   the structure has a structure in which the plurality of carbon nanotubes are knitted like a non-woven fabric fiber, and
   a weight ratio that is a ratio of the weight of the carbon nanotubes adhered to the carbon fibers to the weight of the carbon fibers is within a range of 0.001 to 0.01, and a standard deviation of the weight ratio in a range of 1 m in a length of the carbon fibers is 0.0005 or less.

2. The composite material according to claim 1, further comprising:
   a plurality of fixing resin parts which partially fix some of the carbon nanotubes to the surfaces of the carbon fibers, the plurality of fixing resin parts being formed by curing a resin into particles reaching the surface of the carbon fibers from a surface of the structure,
   wherein on a surface of the structure in plan view, an area ratio of the plurality of fixing resin parts which cover the surface of the structure is within a range of 6% to 45%.

3. The composite material according to claim 2,
   wherein the number of the fixing resin parts per 5 μm square on the surface of the structure in plan view is within a range of 27 to 130.

4. The composite material according to claim 1,
   wherein a thickness of the structure is within a range of 10 to 300 nm.

5. The composite material according to claim 1,
   wherein each of the carbon nanotubes has a diameter within a range of 1 to 15 nm.

6. The composite material according to claim 1,
   wherein a carbon fiber bundle is formed by a plurality of the carbon fibers which are continuous, and
   the structure is formed on each of the carbon fibers of the carbon fiber bundle.

7. The composite material according to claim 6,
   wherein the structure formed on each of the plurality of carbon fibers has an independent structure, and the structure of one of the carbon fibers does not share its carbon nanotubes with the structure of another carbon fiber.

8. A method for manufacturing the composite material according to claim 1, comprising:
- applying ultrasonic vibration to a dispersion in which a plurality of carbon nanotubes in a bent shape having a bent portion are dispersed; and
- immersing a carbon fiber bundle including a plurality of continuous carbon fibers while opening in the dispersion to which the ultrasonic vibration is applied, causing the plurality of carbon nanotubes to adhere to the carbon fibers to form a structure on a surface of each of the carbon fibers,
- wherein a frequency of the ultrasonic vibration is within a range of 200 to 950 kHz, and
- a relationship of Ts≥65,000/fs is satisfied, where fs represents a frequency of the ultrasonic vibration, and Ts second represents immersion time for which a part of the carbon fiber bundle to which the carbon nanotubes adhere, which is immersed in the dispersion.

9. The method for manufacturing the composite material according to claim 8, further comprising:
- forming a plurality of fixing resin parts which partially fix some of the carbon nanotubes of the structure to the surface of the carbon fiber by bringing the carbon fiber bundle that is opened into contact with a treatment liquid obtained by dispersing an uncured resin in a dispersion medium, and evaporating the dispersion medium from the carbon fiber bundle and curing the resin, wherein the plurality of fixing resin parts are formed by curing a resin into particles reaching the surface of the carbon fibers from a surface of the structure.

10. A prepreg comprising:
the composite material according to claim 6; and
a matrix resin in a state of being impregnated into the composite material.

11. A carbon-fiber-reinforced molded article comprising:
the composite material according to claim 6; and
a matrix resin that is cured in a state of being impregnated into the composite material.

12. A carbon-fiber-reinforced molded article comprising:
the composite material according to claim 6; and
a matrix resin that is cured in a state of being impregnated into the composite material,
wherein on the basis of a bending elastic modulus that is measured at a test speed of 5 mm/minute in a three-point bending test conforming to JIS K 7074:1988 by using a test piece having a plate shape which has a length of 100 mm, a width of 15 mm, and a thickness of 1.8 mm, and in which a width direction matches a fiber axis direction of the carbon fibers, an increasing rate of a bending elastic modulus that is measured under the same condition by setting a test speed of 1,000 mm/second is 2% or less.

13. A carbon-fiber-reinforced molded article comprising:
the composite material according to claim 6; and
a matrix resin that is cured in a state of being impregnated into the composite material,
wherein a logarithmic decrement in an amplitude is 0.029% or more, the amplitude being obtained from the amount of displacement of the other end of a test piece that has a plate shape which has a length of 200 mm, a width of 15 mm, and a thickness of 1.8 mm and in which a longitudinal direction matches a fiber axis direction of the carbon fibers, and is horizontally fixed by clamping one end in a length range of 50 mm in the longitudinal direction, and the amount of displacement being measured after pressing the other end of the test piece and releasing the other end of the test piece.

14. A carbon-fiber-reinforced molded article comprising:
the composite material according to claim 6; and
a matrix resin that is cured in a state of being impregnated into the composite material,
wherein when performing a pulsating three-point bending fatigue test in which pressing against a test piece having a plate shape which has a length of 20 mm, a width of 15 mm, and a thickness of 1.8 mm and in which a width direction matches a fiber axis direction of the carbon fibers from an upward side and release of the pressing are repeated in a state of supporting the test piece from a lower side with a pair of supporting points disposed to be spaced apart from each other by 20 mm in a longitudinal direction of the test piece, the number of times of repetition of pressing until a load at the time of pressing performed when a stress amplitude is within a range of 1,100 to 1,300 MPa reaches zero is within a range of 92,000 to 1,000,000.

* * * * *